US012554938B2

(12) United States Patent
Gandhi et al.

(10) Patent No.: US 12,554,938 B2
(45) Date of Patent: Feb. 17, 2026

(54) SEMANTIC INTERPRETER FOR NATURAL LANGUAGE COMMANDING IN APPLICATIONS VIA PROGRAM SYNTHESIS

(71) Applicant: Microsoft Technology Licensing, LLC, Redmond, WA (US)

(72) Inventors: Apurva Sandeep Gandhi, Union City, CA (US); Thong Quang Nguyen, Seattle, WA (US); Ameya Shyam Bhatawdekar, Sammamish, WA (US); Huitian Jiao, Snoqualmie, WA (US); Robert Steen, Seattle, WA (US); Ajitesh Kishore, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 18/315,280

(22) Filed: May 10, 2023

(65) Prior Publication Data
US 2024/0378399 A1 Nov. 14, 2024

(51) Int. Cl.
*G06F 40/40* (2020.01)
*G06F 8/41* (2018.01)
(Continued)

(52) U.S. Cl.
CPC ............ *G06F 40/40* (2020.01); *G06F 8/427* (2013.01); *G06F 16/3329* (2019.01);
(Continued)

(58) Field of Classification Search
CPC .. G06F 40/40; G06F 16/3329; G06F 16/3344; G06F 16/338; G06F 16/345;
(Continued)

(56) References Cited

U.S. PATENT DOCUMENTS

| 2017/0075988 A1* | 3/2017 | Kadiri | G06N 5/02 |
| 2023/0109681 A1* | 4/2023 | Gotmare | G06N 3/0475 |
| | | | 704/9 |

(Continued)

FOREIGN PATENT DOCUMENTS

| CN | 107015813 A * | 8/2017 | G06F 8/72 |

OTHER PUBLICATIONS

Zhou, DocPrompting, Generating Code by Retrieving Docs, Feb. 18, 2023, arXiv, whole document (Year: 2023).*

(Continued)

*Primary Examiner* — Sonia L Gay
(74) *Attorney, Agent, or Firm* — NovoTechIP International PLLC

(57) ABSTRACT

A data processing system implements receiving a natural language query from a client device, the query including a textual description of one or more actions to be performed using an application on the client device, generating a prompt for a large language model (LLM) based on the natural language query; providing the prompt to the LLM to obtain program code, which when executed, causes the application to perform the one or more actions, the first program code being implemented in a domain specific language (DSL) designed to facilitate program synthesis via the LLM; analyzing a syntax of the first program code to identify syntax errors in the first program code; correcting the syntax errors in the program code to generate corrected program code; and causing the client device to execute the program code to perform the one or more actions in the application on the client device.

18 Claims, 15 Drawing Sheets

(51) Int. Cl.
| | |
|---|---|
| *G06F 16/3329* | (2025.01) |
| *G06F 16/334* | (2025.01) |
| *G06F 16/338* | (2019.01) |
| *G06F 16/34* | (2025.01) |
| *G06F 40/166* | (2020.01) |
| *G06F 40/211* | (2020.01) |
| *G06F 40/279* | (2020.01) |
| *G06F 40/30* | (2020.01) |

(52) U.S. Cl.
CPC ........ *G06F 16/3344* (2019.01); *G06F 16/338* (2019.01); *G06F 16/345* (2019.01); *G06F 40/166* (2020.01); *G06F 40/211* (2020.01); *G06F 40/279* (2020.01); *G06F 40/30* (2020.01)

(58) Field of Classification Search
CPC .... G06F 40/279; G06F 40/166; G06F 40/211; G06F 40/30; G06F 8/427
See application file for complete search history.

(56) References Cited

U.S. PATENT DOCUMENTS

| | | | |
|---|---|---|---|
| 2024/0160422 A1* | 5/2024 | Raj | G06F 8/51 |
| 2024/0281621 A1* | 8/2024 | Janakiraman | G06F 40/47 |
| 2024/0289395 A1* | 8/2024 | Zhou | G06F 16/9532 |
| 2024/0319970 A1* | 9/2024 | Watson | G06F 8/35 |
| 2024/0362421 A1* | 10/2024 | Markov | G06F 40/216 |

OTHER PUBLICATIONS

International Search Report and Written Opinion received for PCT Application No. PCT/US2024/028450, Sep. 6, 2024, 16 pages.

"Large language model", Wikipedia, Retrieved from Internet URL: https://en.wikipedia.org/w/index.php?t%20itle=Large%20language%20model&oldid=1145566451, Mar. 19, 2023, 09 pages.

Gerhard Paa, et al., "Foundation Models for Natural Language Processing—Pre-trained Language Models Integrating Media", Springer Nature, Feb. 16, 2023, 436 pages.

"Pinecone", Retrieved from: https://www.pinecone.io/, Retrieved Date: Jan. 13, 2023, 11 Pages.

"Qdrant", Retrieved from: https://qdrant.tech/#, Retrieved Date: Jan. 13, 2023, 4 Pages.

"Vector Database Built for Scalable Similarity Search", Retrieved from: https://milvus.io/, Retrieved Date: Jan. 13, 2023, 5 Pages.

"Vespa", Retrieved from: https://vespa.ai/, Retrieved Date: Jan. 13, 2023, 9 Pages.

"What is Vector Search?", Retrieved from: https://www.elastic.co/what-is/vector-search, Retrieved Date: Jan. 13, 2023, 5 Pages.

Bernhardsson, et al., "Annoy", Retrieved from: https://github.com/spotify/annoy, Apr. 10, 2023, 10 Pages.

Bernhardsson, et al., "Benchmarking Nearest Neighbors", Retrieved from: https://github.com/erikbern/ann-benchmarks, Apr. 27, 2023, 14 Pages.

Ji, et al., "Survey of Hallucination in Natural Language Generation", in Repository of arXiv:2202.03629v3, Nov. 2022, pp. 1-47.

Karsin, "SPTAG: A Library for Fast Approximate Nearest Neighbor Search", Retrieved from: https://github.com/microsoft/SPTAG, Apr. 10, 2023, 8 Pages.

Spataro, Jared, "Introducing Microsoft 365 Copilot—your Copilot for Work", Retrieved from: https://blogs.microsoft.com/blog/2023/03/16/introducing-microsoft-365-copilot-your-copilot-for-work/, Mar. 16, 2023, 8 Pages.

Wright, Johannav., "A New Era for AI and Google Workspace", Retrieved from: https://workspace.google.com/blog/product-announcements/generative-ai, Mar. 15, 2023, 13 Pages.

International Preliminary Report on Patentability (Chapter I) received for PCT Application No. PCT/US2024/028450, mailed on Nov. 20, 2025, 11 pages.

* cited by examiner

DSL Program Code

```
# Add cube to the slide and set the color to teal
slides = select_slides()
shapes = insert_shapes(shapeType="cube", slides=slides)
format_shapes(shapes=shapes, fillColor="teal", fillTransparency=0.3, height=200, width=200)
text = select_text(scope=shapes)
text = insert_text(precededBy=title, text="Box")
format_text(textRanges=text, horizontalAlignment="Center")
```

FIG. 10

Abstract Syntax Tree

```
{
 "statements": [
   { "name": "select_slides",
     "returnVariable": "slides",
     "arguments": []
   },
   {
    "name": "insert_shapes",
    "returnVariable": "shapes",
    "arguments": [
      { "name": "shapeType", "value": "\"cube\"" },
      { "name": "slides", "value": "slides" }
    ]
   },
   {
    "name": "format_shapes",
    "returnVariable": null,
    "arguments": [
      { "name": "shapes", "value": "shapes" },
      { "name": "fillColor", "value": "\"teal\"" },
      { "name": "fillTransparency", "value": "0.3" },
      { "name": "height", "value": "200" },
      { "name": "width", "value": "200" }
    ]
   },
   {
    "name": "select_text",
    "returnVariable": "text",
    "arguments": [{ "name": "scope", "value": "shapes" }]
   },
   {
    "name": "insert_text",
    "returnVariable": "text",
    "arguments": [
      { "name": "precededBy", "value": "text" },
      { "name": "text", "value": "\"Box\"" }
    ]
   },
   {
    "name": "format_text",
    "returnVariable": null,
    "arguments": [
      { "name": "textRanges", "value": "text" },
      { "name": "horizontalAlignment", "value": "\"Center\"" }
    ]
   }
  ]
}
```

FIG. 11

Document Context Information

```
{
  "slides": [
    {
      "index": 0,
      "shapes": [
        {
          "index": 0,
          "textRange": {
            "text": "Video Games",
            "color": "#000000",
            "bold": false,
            "italic": false,
            "underline": "None",
            "fontName": "Segoe UI Semibold",
            "size": 36,
            "bulleted": false
          },
          "type": "GeometricShape",
          "name": "Title 1",
          "left": 52.1099212598425,
          "top": 36,
          "height": 43.6218897637795,
          "width": 976.05,
          "lineColor": "",
          "lineDashStyle": "Solid",
          "lineWeight": -1,
          "lineTransparency": -1,
          "fillColor": ""
        },
        {
          "index": 1,
          "textRange": {
            "text": "Video games,[a] also known as computer games, are electronic games that involve interaction with a user interface or input device – such as a joystick, controller, keyboard, or motion sensing device – to generate audiovisual feedback. )\r",
            "color": "",
            "bold": false,
            "italic": false,
            "underline": "None",
            "fontName": "",
            "size": 20,
            "bulleted": false
          },
          "type": "GeometricShape",
          "name": "body",
          "left": 95.8344881889764,
          "top": 103.78125984252,
          "height": 411.984409448819,
          "width": 838.551732283465,
          "lineColor": "",
          "lineDashStyle": "Solid",
          "lineWeight": -1,
          "lineTransparency": -1,
          "fillColor": ""
        }
      ]
    }
  ]
}
```

FIG. 12

SEMANTIC INTERPRETER FOR NATURAL LANGUAGE COMMANDING IN APPLICATIONS VIA PROGRAM SYNTHESIS

BACKGROUND

Applications provide user interfaces that enable users to interact with the application to view, create, and/or modify electronic content. User interfaces are typically designed to provide a user-friendly set of controls that enable users to access the functionality provided by the applications. However, as applications continue to offer more and more functionality, the user experience can be negatively impacted as the user interface becomes increasingly complex to support these additional features. Hence, there is a need for improved systems and methods that provide a technical solution for improving the user interface of applications.

SUMMARY

An example data processing system according to the disclosure includes a processor and a machine-readable medium storing executable instructions. The instructions when executed cause the processor to perform operations including receiving a first natural language query from a first user via a first user interface of a first client device, the first natural language query comprising a textual description of one or more actions to be performed using a first application on the first client device; selecting one or more DSL program code samples from a sample DSL program code datastore based on attributes of the first natural language query by determining query embeddings for the first natural language query using an LLM-based encoder associated with the first LLM, comparing the query embeddings with sample embeddings associated with each of the DSL program code samples of the DSL program code datastore, the sample embeddings having been determined using the LLM-based encoder associated with the first LLM, and selecting the one or more sample DSL program code samples based on a similarity between the query embeddings and the sample embeddings associated with the one or more sample DSL program code samples; generating a first prompt for a first large language model (LLM) based on the first natural language query from the first user and the one or more DSL program code samples; providing the first prompt to the first LLM to obtain a first program code, which when executed, causes the first application to perform the one or more actions, the first program code being implemented in a domain specific language (DSL); analyzing a syntax of the first program code to identify syntax errors in the first program code; correcting the syntax errors in the first program code to generate corrected program code; and causing the first client device to execute the first program code to perform the one or more actions in the first application on the first client device.

An example data processing system according to the disclosure includes a processor and a machine-readable medium storing executable instructions. The instructions when executed cause the processor to perform operations including receiving a first natural language query and document context information from a first user via a first user interface of a first client device, the first natural language query comprising a textual description of one or more actions to be performed using a first application on the first client device, the document context information providing attributes of electronic content in the first application to be modified according to the first natural language query, to be used to generate new content based on the electronic content, to be used add the new content to the electronic content, or a combination thereof; generating a first prompt for a first large language model (LLM) based on the first natural language query and the document context information; providing the first prompt to the first LLM to obtain a first program code, which when executed, causes the first application to perform the one or more actions, the first program code being implemented in a domain specific language (DSL); analyzing a syntax of the first program code to identify syntax errors in the first program code by parsing the first program code into an abstract syntax tree structure which represents the structure of the first program code; and comparing the abstract syntax tree structure with a syntax definition for the DSL to identify the syntax errors; correcting the syntax errors in the first program code to generate corrected program code by updating the abstract syntax tree structure according to the syntax definition for the DSL; and causing the first client device to execute the first program code to perform the one or more actions in the first application on the first client device.

An example method implemented in a data processing system for providing natural language commands in an application includes receiving a first natural language query from a first user via a first user interface of a first client device, the first natural language query comprising a textual description of one or more actions to be performed using a first application on the first client device; selecting one or more DSL program code samples from a sample DSL program code datastore based on attributes of the first natural language query by determining query embeddings for the first natural language query using an LLM-based encoder associated with the first LLM, comparing the query embeddings with sample embeddings associated with each of the DSL program code samples of the DSL program code datastore, the sample embeddings having been determined using the LLM-based encoder associated with the first LLM, and selecting the one or more sample DSL program code samples based on a similarity between the query embeddings and the sample embeddings associated with the one or more sample DSL program code samples; generating a first prompt for a first large language model (LLM) based on the first natural language query from the first user and the one or more DSL program code samples; providing the first prompt to the first LLM to obtain a first program code, which when executed, causes the first application to perform the one or more actions, the first program code being implemented in a domain specific language (DSL); analyzing a syntax of the first program code to identify syntax errors in the first program code; correcting the syntax errors in the first program code to generate corrected program code; and causing the first client device to execute the first program code to perform the one or more actions in the first application on the first client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 10 is an example of domain-specific language program code according to the techniques herein.

FIG. 11 is an example of an abstract syntax tree generated from domain-specific language program code according to the techniques herein.

FIG. 12 is an example of document context information.

DETAILED DESCRIPTION

Figure 1A:
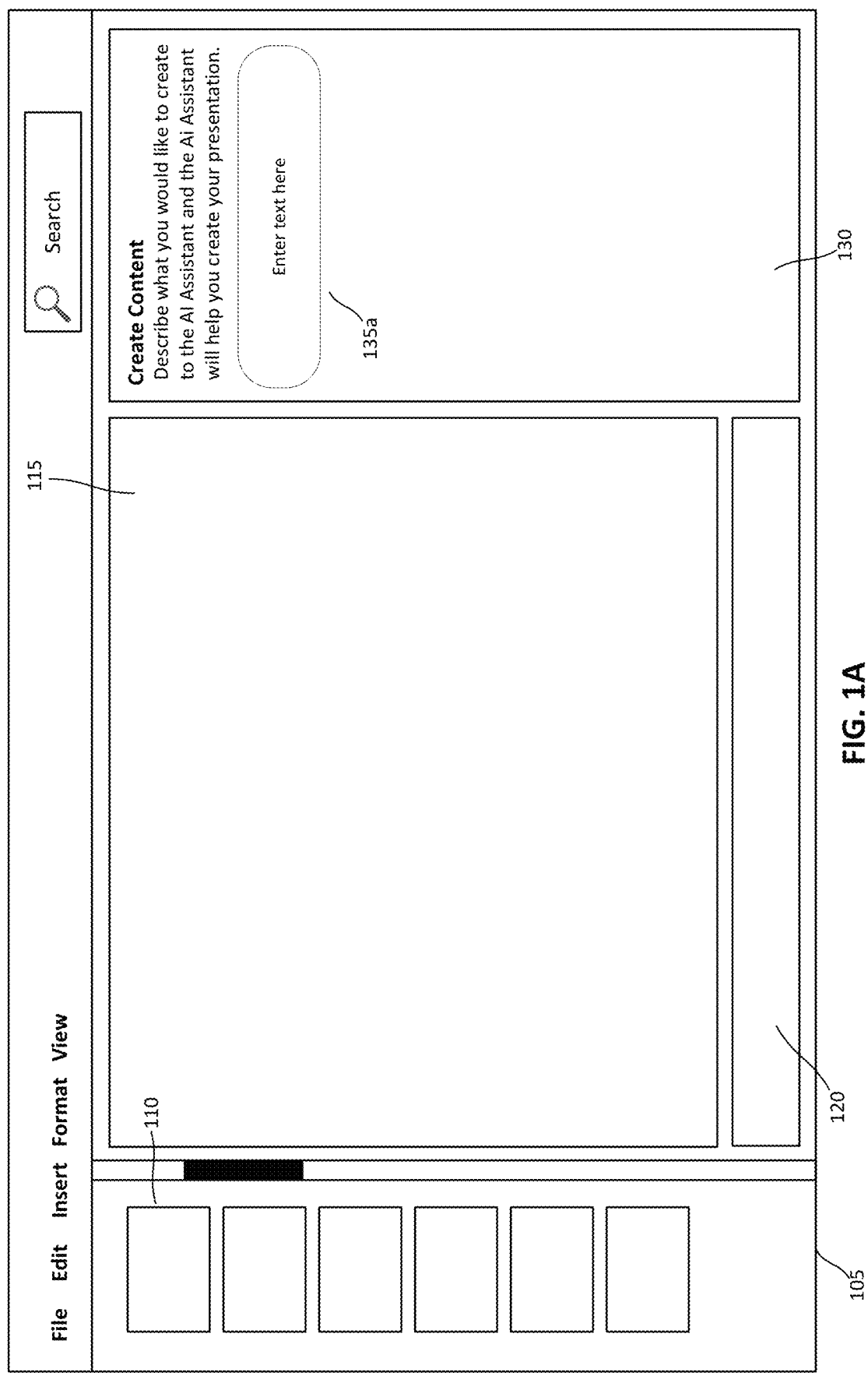
FIG. 1A-1C are diagrams showing example user interfaces of an implementation of an application that implements the natural language commanding described herein.

Systems and methods for providing a semantic interpreter for natural language commanding in an application are described herein. These systems and methods address the technical problems associated with current applications which provide user interfaces for users to interact with the application to view, create, and/or modify content. Users may struggle to perform tasks and/or overlook useful features in an application because they do not know where to look for these features in the user interface provided by the application. The techniques herein address the problems associated with the current approaches for interacting with applications by providing an interface in which users issue natural language commands to the application. This approach enables the user to communicate their intent to the application in language which is familiar to the user without requiring the user to navigate through the various controls of the user interface of the application.

The techniques herein provide a semantic interpreter for analyzing natural language commands in an application for determining and executing user intent. These techniques formulate a prompt for a Large Language Model (LLM) from natural language commands provided by a user. In some implementations, the LLM is implemented using a Generative Pre-trained Transformer 3 (GPT-3) or GPT-4 models. Other LLMs may be used in other implementations. The prompt constructed from the user input is provided to the generative model for analysis and the generative model outputs program code that when executed by the application fulfills the user intent. A technical benefit of this approach leverages the strengths of generative models to understand user intent based on the textual commands input by the user and to generate textual content based on the user intent. Another technical benefit of this approach is that the model outputs the program code in a Domain Specific Language (DSL) that abstracts the application-specific commands into a concise language that is designed for use with generative models. The DSL utilizes a constrained syntax that facilitate autocorrection of the code generated by the DSL model, which ensures that the code generated by the generative model will operate without causing any errors or unsafe conditions in the application. Furthermore, the DSL interpreter is designed to be easily extensible to enable the DSL syntax to express the user intent in additional ways.

The techniques herein also enable the user to manipulate existing content in the application rather than simply rely on the generative model to generate new content. A lightweight tree-based representation of the application context, referred to herein as a context tree, is provided to the model as an input to enable the model to manipulate existing content and/or to generate new content based on the application context. The new content may be added to the existing application content. A technical benefit of this approach is that the user can not only use natural language to describe new content that the user would like to create but also describe how to modify the existing content using natural language and/or to generate new content based on and/or to be added to the existing content. This approach can significantly improve the user experience and the user workflow because the user does not need to understand the controls and/or commands in the application to create and/or modify professional quality content that would otherwise require the user to have advanced skills in the application in which the content is being created and/or modified. These and other technical benefits of the techniques disclosed herein will be evident from the discussion of the example implementations that follow.

Figure 1B:
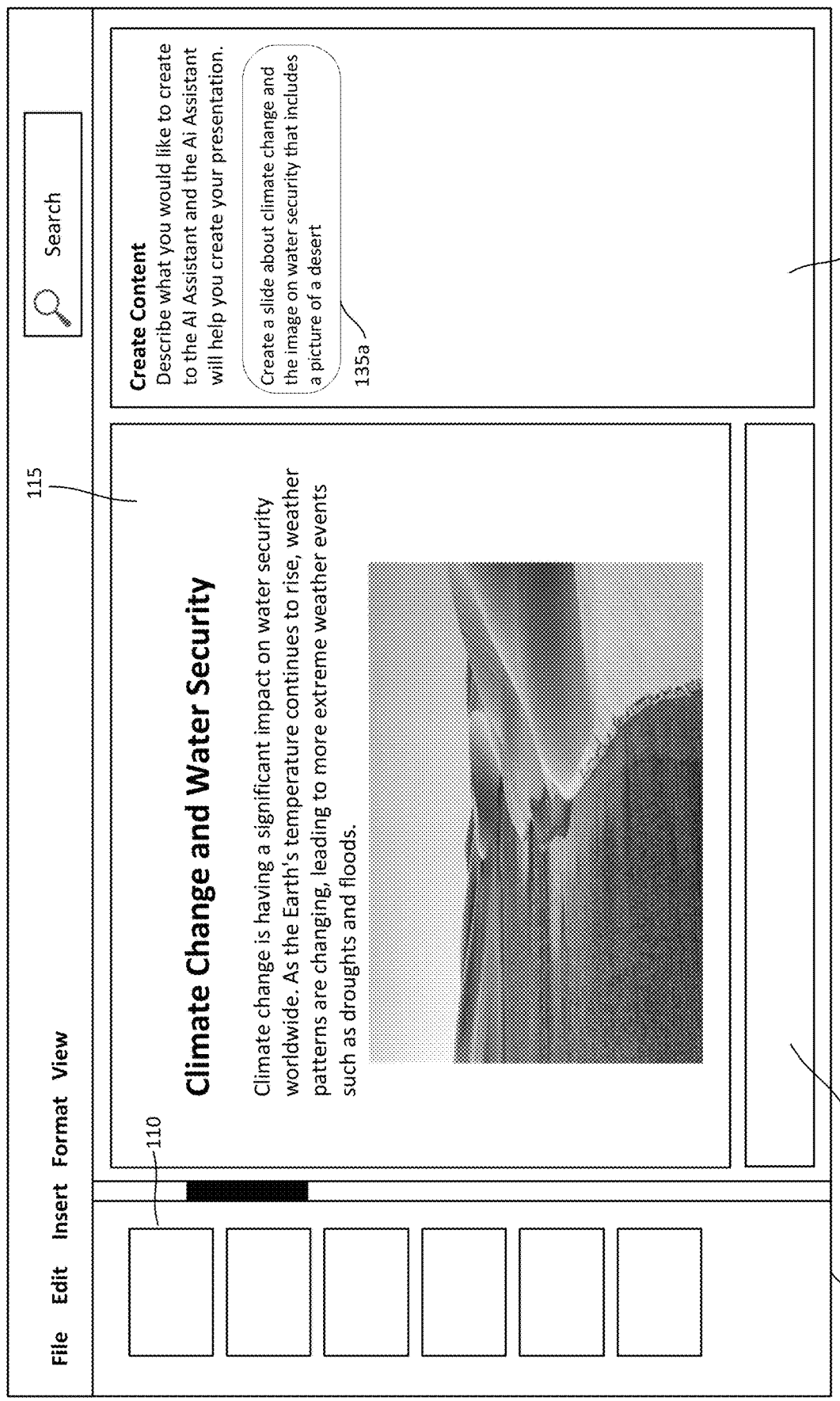
Figure 1C:
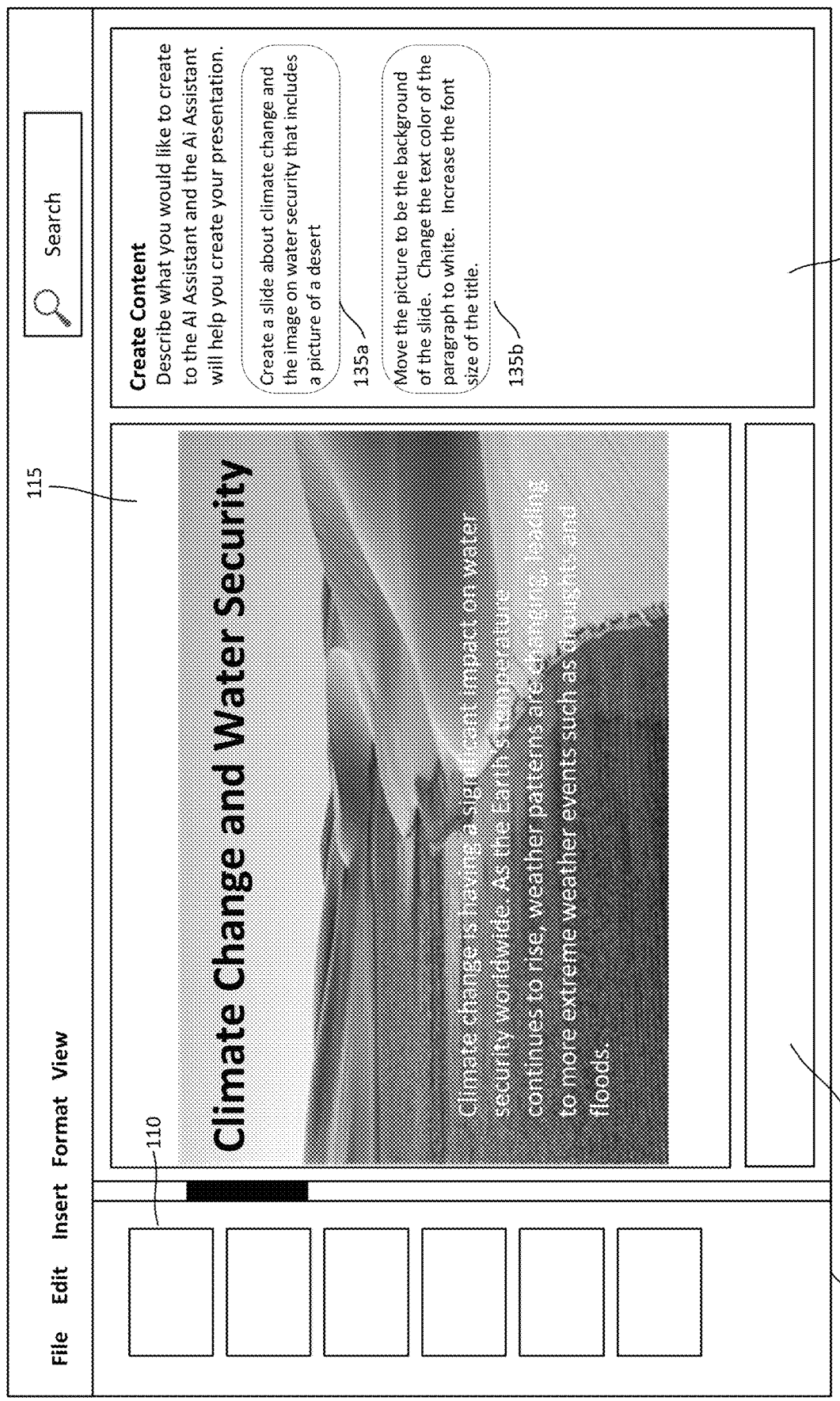

FIGS. 1A-1C are diagrams showing an example user interface 105 of an example application which implements the natural language commanding techniques provided herein. The example application in the examples shown in FIGS. 1A-1C is a slide presentation application for authoring, modifying, and/or presenting presentation content. The slide presentation application in this example enables the user to present the presentation content online to an audience of users who are not present at the same physical location as the presenter and/or to an audience located in the same physical location as the presenter. The techniques herein are not limited to a slide presentation application and may be utilized in other applications in which users author and/or modify content to enable users to use natural language commands to prompt a generative model to generate new content and/or modify existing content. Such applications may include, but are not limited to word processing applications, drawing applications, collaboration platforms for collaborating with other users to author content, and/or other types of applications in which users may create and/or modify content and/or collaborate with other users to create such content. The user interfaces shown in FIGS. 1-C are implemented by a native application on a client device of a user in some implementations and by a web application implemented by a cloud-based application services platform, in other implementations. Examples of such a client device and application service platform are shown in FIG. 2.

FIG. 1A shows the user interface 105 of the example presentation application. The user interface includes a set of thumbnails 110 that represent the slides of the presentation. The user may click on or otherwise activate a thumbnail to cause the presentation application to display the corresponding slide in the content pane 115. Below the content pane is a notes pane 120. The notes pane 120 allows the user to add notes to be associated with the slide currently displayed on the content pane 115. Each slide of the presentation may be associated with its own notes. The notes may include transcript information or other information that may be used by the presenter while presenting the presentation content to an audience. The notes would not be presented to the audience viewing the presentation.

The user interface 105 also includes a content creation pane 130 that enables the user to issue natural language commands to the application which utilizes a generative model according to the techniques herein to implement the user intent expressed in the natural language commands. In the example implementation shown in FIGS. 1A-1C, the content creation pane 130 is formatted like a chat messaging window in which the user may enter natural language commands describing the content that the user would like to create or how the user would like to modify existing content. In the example shown in FIG. 1A, the user is creating a new slide for a presentation and enters a first natural language description of what the user would like to create into text input field 135a. FIG. 1B shows an example of such an initial prompt having been entered by the user, and the slide generated according to the techniques described herein is displayed in the content pane 115 of the user interface 105. FIG. 1C shows an example in which the user enters a second natural language command into the text input field 135b to cause the application to modify the slide that was created in response to the first natural language command. As will be discussed in detail in the examples which follow, the generative model is able to modify the existing content and/or generate new content based on the existing content and/or to be added to the existing content by including document context information representing a current state of the context of content being authored as an element of the prompt provided to the generative model. The examples which follow describe how the DSL is used by the generative model to implement the user intent within the application.

Figure 2:
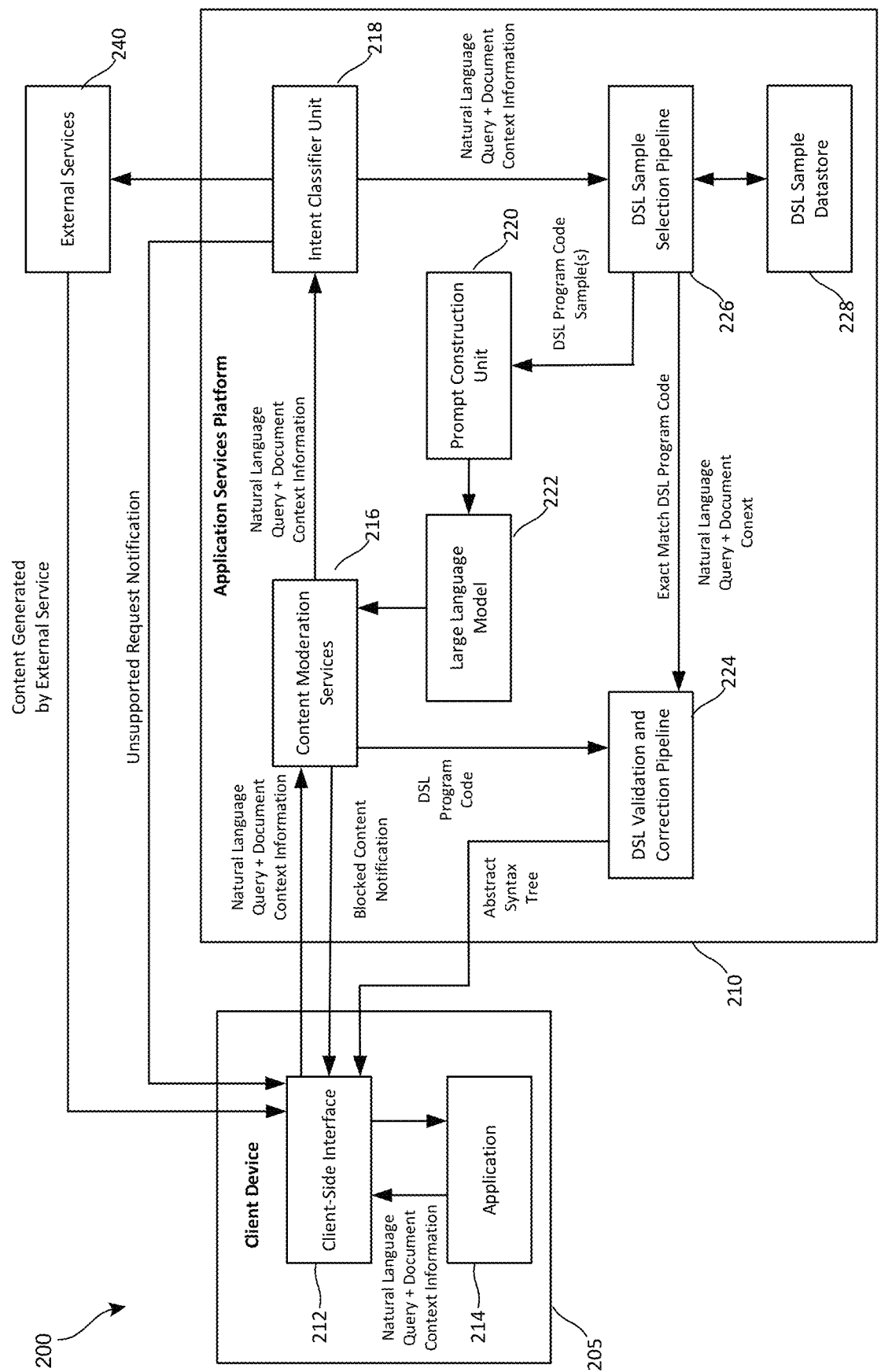
FIG. 2 is a diagram of an example computing environment in which the natural language commanding techniques described herein may be implemented.

FIG. 2 is a diagram of an example computing environment 200 in which the techniques disclosed herein for providing natural language commanding in an application may be implemented. In the example implementation shown in FIG. 2, the computing environment includes a client device 205 and an application services platform 210. The application services platform 210 provides one or more cloud-based applications and/or provides services to support one or more web-enabled native applications on the client devices 205. These applications may include but are not limited to presentation applications, word processing applications, web site authoring applications, collaboration platforms, communications platforms, and/or other types of applications in which users may create, view, and/or modify various types of electronic content using the natural language commanding techniques provided herein. The client device 205 and the application services platform 210 communicate with each other over a network (not shown). The network may be a combination of one or more public and/or private networks and may be implemented at least in part by the Internet.

The client devices 205 is a computing device that may be implemented as a portable electronic device, such as a mobile phone, a tablet computer, a laptop computer, a portable digital assistant device, a portable game console, and/or other such devices in some implementations. The client device 205 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 2 includes a single client device 205, other implementations may include a different number of client devices that utilize service provided by the application services platform 210.

The client device 205 includes an application 214 and a client-side interface 212. The application 214 is a web-enabled native application in some implementations that enables users to view, create, and/or modify electronic content. The web-enabled native application utilizes services provided by the services platform 210 including but not limited to the analysis of natural language commands entered by a user to generate and/or modify content in the native application. The native application implements the user interface 105 shown in FIGS. 1A-1C in some implementations. In other implementations, the application 214 is a browser application for accessing and viewing web-based content provided by the application services platform 210. In such implementations, the application services platform 210 implements one or more web applications that enables users to view, create, and/or modify electronic content. The web application implements the user interface 105 shown in FIGS. 1A-1C in some implementations. The application services platform 210 supports both web-enabled native applications and a web application in some implementations, and the users may choose which approach best suits their needs.

The client-side interface 212 handles communications between the application services platform 210 and the client device 205. The client-side interface 212 receives natural language queries from the application 214 and sends the natural language queries to the application services platform 210 for processing. The client-side interface 212 also receives document context information from the application 214 with the natural language query where the natural language query is intended to create new content and/or modify existing content, such as in the example shown in FIG. 1C. The client-side interface 212 receives an intermediate representation of executable code generated by the LLM 222 or other generative model of the application services platform 210. As discussed in the examples which follow, the intermediate code is represented as an abstract syntax tree (AST) in some implementations. The abstract syntax tree is described in greater detail with respect to FIG. 3. The client-side interface 212 also receives an indication that the natural language query is associated with blocked content in some instances. The application services platform 210 includes content moderation services 216 which analyze the natural language query and content generated by the generative model or models to ensure that the natural language query and the content generated by the generative model do not include potentially offensive or objectionable content. Additional details of the content moderation services 216 are described in greater detail with respect to FIG. 4.

The application services platform 210 provides the natural language query and the document context received from the client device 205 to the content moderation services 216. The document context is provided by the client-side interface 212 for instances in which the natural language query may modify existing electronic content. An example of such document content information is shown in FIG. 12. The document context information is stored in a lightweight tree structure, which is referred to herein as a context tree. The document context information includes information that describes the current state of the electronic content in the application 214 in sufficient detail to permit the LLM 222 to be able to modify this content based on the natural language query and/or generate new content based on and/or to be added to the application context. The document context can also be used by the LLM 222 when generating new content. The document content information may include but is not limited to the layout of a presentation slide or other document, the location and size of images within the slide or document, the text included in the slide or document and the attributes of the that text, the location of the text within the document, the source files or locations for obtaining the images included in the slide or document, and/or other information that describes elements of the slide or document and the content therein. The LLM 222 uses this information to provide context when modifying existing content. The LLM 222 generates DSL program code that includes instructions that, when executed, cause the application 214 to perform actions to modify the content. The LLM 222 generates textual content, including grounded textual content in some instances that may be provided to the client device 205 for incorporation into the existing slide or document. The textual content generated by the LLM may be incorporated into the DSL program code generated by the LLM 222, the AST generated from the DSL program code, and the platform-specific program code generated by a transpiler from the AST.

The content moderation services 216 analyzes the natural language query and the document context and returns a blocked content notification to the client-side interface 212 of the client device 205 in response to the natural language query or the document context including offensive or objectionable content. The natural language query and the document content (if received with the natural language query) are provided as an input to the intent classifier unit 218 in response to the content moderation service 216 making a determination that no offensive or objectionable content was detected.

The intent classifier unit 218 determines whether the natural language query entered by the user is within scope of the services provided by the application services platform 210. Within scope means that the natural language query expresses an intent that can be executed by the application services platform 210. In some implementations, a classifier model is used to analyze the natural language query to determine the user intent. The classifier model is implemented using a natural language processing (NLP) model that is trained to analyze a textual input and to classify the query into one of a set of categories of requests. The classifier model may also receive as an input an indication of the application type from which the natural language query has originated in implementations where the application services platform 210 supports multiple applications. The application services platform 210 may implement different categories of request for each of the applications. For example, the application services platform 210 may support a first set of categories of actions for a presentation application, including: (1) create a new presentation, (2) add a slide to the presentation, (3) add text to a slide, (4) rewrite the text of a slide or slides, (5) add an image or images to a slide or slides, (6) changing the format of text of a slide or an element of a slide, and (7) unsupported. The classifier model categorizes any natural language queries that do not fall into one of the other categories as an unsupported action that cannot be performed by the application services platform 210. The specific categories associated with each application may vary. Furthermore, the classification model can be updated to support additional categories as support for natural language commands are provided. If the intent classifier unit 218 determines that the natural language query and the document context (where applicable) are associated with a supported category of action, the natural language query and the document context are provided to the DSL selection pipeline 226 for processing. Otherwise, if the intent classifier unit 218 determines that the natural language query and the document context are associated with an unsupported category of action, the intent classifier unit 218 sends the natural language query and the document context to the external services 240 if one of those services are determined to support the requested category of action. In a non-limiting example, the natural language query entered by the user requests that a video be generated on a particular topic but the application services platform 210 does not support the creation of video content. However, one of the external services 240 supports text-to-video content generation, so the intent classifier unit 218 sends the natural language query to the external services 240 for processing.

The DSL selection pipeline 226 analyzes the natural language query and the document context and selects sample DSL code examples from the DSL sample datastore 228. The sample DSL code examples are included in the prompt provided to the LLM 222 to help the generative model produce a valid DSL program. Because the prompt size that is provided to the LLM 222 is limited, the DSL sample selection pipeline selects the most relevant samples from the DSL sample datastore 228 to be included in the prompt. Additional details of the DSL selection pipeline 226 are provided in FIG. 5, discussed below. If the DSL selection pipeline 226 finds an exact match of the DSL needed to implement the user intent represented in the natural language query, the DSL selection pipeline 226 provides the sample DSL to the DSL validation and correction pipeline 224 to identify and correct any errors in the sample DSL. Otherwise, if the DSL selection pipeline 226 is unable to identify an exact match for the DSL required to implement the intent represented in the natural language query, the DSL selection pipeline 226 provides a set of sample DSL samples to the prompt construction unit 220 to generate a prompt to the LLM 222 to generate a new DSL program. The DSL selection pipeline 226 provides a set of sample DSL programs to the LLM 222 as part of the prompt to generate the new DSL. Additional details of how the DSL selection pipeline 226 selects these samples is discussed with respect to FIG. 5, below. The DSL selection pipeline 226 also passes the natural language query and the document context to the prompt construction unit 220.

The prompt construction unit 220 constructs a prompt to the LLM 222, which is a generative model which generates DSL program code as an output that implements the user intent expressed in the natural language query. The prompt construction unit 220 includes the natural language query and the DSL samples provided by the DSL selection pipeline 226. The prompt construction unit 220 also includes the document context where the natural language prompt is used to modify existing content in the application 214. Additional details of how the prompt construction unit 220 constructs the prompt are discussed below with respect to FIG. 6, which provides an example implementation of the prompt construction unit 220.

The prompt construction unit 220 includes additional content in the prompt in some implementations based on the entities identified by the entity classifier unit 502 of the DSL sample selection pipeline 226. The DSL sample selection pipeline 226 provides this entity information to the prompt construction unit 220. The prompt construction unit 220 uses the entity information to obtain a syntax description for each of the entities from a DSL syntax description. The syntax description includes statement usage examples and comments describing what the DSL statements are achieving in some implementations. The prompt construction unit 220 also uses the entity information to obtain rules and/or guideline information associated with each of the entities. These rules or guideline information can help prevent hallucinations by the LLM 222. In a non-limiting example, the rules for a slide presentation application may include a rule that states that: "When inserting multiple slides into a presentation, count is not a valid parameter for insert_slides. Instead, use the insert_slides statements multiple times." The rules and/or guidelines information provide the LLM 222 with additional information that helps the LLM 222 generate valid DSL program code.

The LLM 222 receives the prompt from the prompt construction unit 220, analyzes the prompt, and outputs DSL program code to implement the user intent expressed in the natural language query. The LLM 222 generates additional content based on the natural language query in some implementations. The additional content may include textual content, images, videos, and/or other types of content that are supported by the model. Unsupported requests detected by the intent classifier unit 218 are either redirected to the external services 240 or the intent classifier unit 218 sends an indication to the client device 205 that the user has requested an unsupported operation.

The LLM 222 provides the DSL program code and other generated content to the content moderation services 216, which analyze the DSL to ensure that neither the DSL program code and/or the content generated by the generative model include potentially offensive or objectionable material. Additional details of the content moderation services 216 are described in greater detail with respect to FIG. 4. If the content moderation services 216 determine that the LLM 222 inadvertently generated DSL program code or other content that appears to be offensive or objectionable, the content moderation services 216 sends a blocked content notification to the client-side interface 212 of the client device 205 indicating that the natural language query could not be processed. The user may attempt to revise and resubmit the query. The content moderation services 216 logs an error condition in blocked content log stored in a persistent memory of the application services platform 210, in some implementations. The content moderation services 216 includes the natural language query, the DSL code output by the model, and the document context (if available). Other content generated by the content moderation services 216 that contains material determined to be offensive or objectionable is also stored. This information allows an administrator to review the error condition information to determine whether the DSL program code and/or other content generated by the LLM 222 should be blocked. A technical benefit of this approach is that it provides a safeguard in case the model inadvertently generates offensive or objectionable content. The LLM 222 may require additional fine-tuning to prevent the generation of such offensive or objectionable content in the future.

The content moderation services 216 provides the DSL code and/or other content generated by the LLM 222 to the DSL validation and correction pipeline 224. The natural language prompt and the document context may also be provided to the DSL validation and correction pipeline 224. The DSL validation and correction pipeline 224 analyze the DSL code generated by the LLM 222 to ensure that the syntax of the program code is valid and makes correction to the DSL program code in the event that errors in the syntax are detected in the program code. DSL program code examples are provided to the generative model as part of the prompt to provide the model with examples of the correct syntax. However, the model may still generate DSL program code that includes syntax errors in some instances. DSL validation and correction pipeline 224 is configured to convert the DSL program code into an intermediate representation, such as an abstract syntax tree, in some implementations. The abstract syntax tree represents the statements, parameters provided to each of the statements, and the associated metadata from the DSL program code in a tree structure that can be easily parsed and the syntax validated. The abstract syntax tree is provided to the client device 205, and the client-side interface 212 converts the intermediate representation of abstract syntax tree into platform-specific implementation code that can be executed on the client device 205. Additional details of the DSL validation and correction pipeline 224, the abstract syntax tree, and the client device 205 are described in greater detail with respect to FIG. 3.

Figure 3:
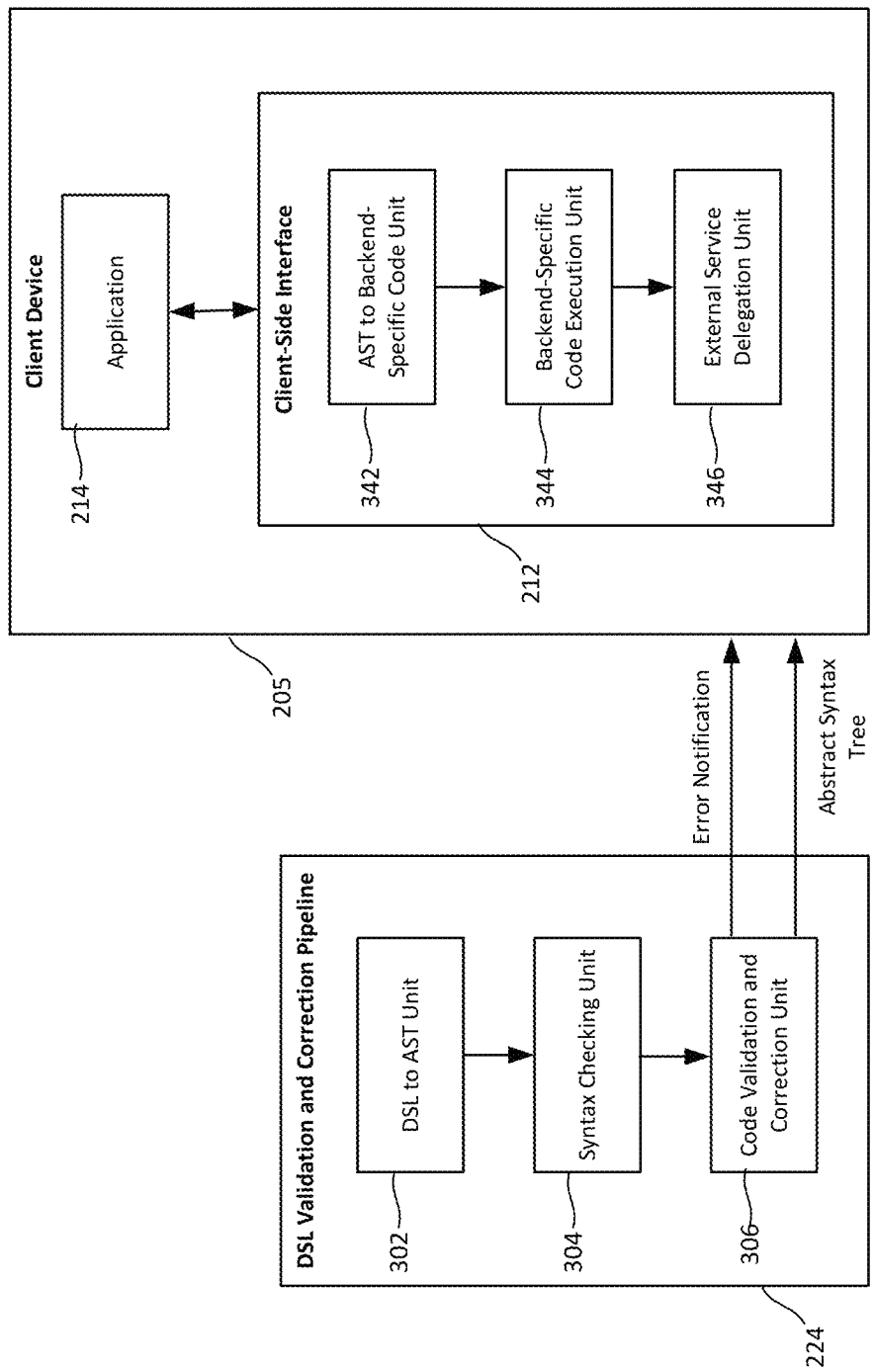
FIG. 3 is a diagram showing additional details of the DSL validation and correction pipeline and the client device shown in FIG. 2.

FIG. 3 is a diagram showing an example implementation of the DSL validation and correction pipeline 224 of the application services platform 210 and an example implementation of the client-side interface 212 of the client device 205. The DSL validation and correction pipeline 224 analyzes the DSL program code generated by the LLM 222 and corrects syntax errors in the DSL program code. Generative models, such as the LLM 222, can experience hallucinations in which the generated content is nonsensical or unfaithful to provided source content. The generative model may experience intrinsic or extrinsic hallucinations. Intrinsic hallucinations contradict the source content, and extrinsic hallucinations cannot be verified or contradicted by the source content. With respect to intrinsic hallucination, the LLM 222 may sometimes generate DSL program code with syntax outside of the DSL language definition or generate DSL program code that does not match the intent of the natural language query input by the user. Examples of such intrinsic hallucinations may include but are not limited to the DSL program code including unsupported control flow statements or loops, the DSL program code including unsupported statements and/or unsupported parameters to valid statements, or the DSL program code including statements which rewrite a document in a different style. Examples of intrinsic hallucinations may include but are not limited to unverifiable content for a presentation, slide, or other electronic content.

The DSL validation and correction pipeline 224 includes a DSL to AST unit 302, a syntax checking unit 304, and a code validation and correction unit 306. The DSL to AST unit 302 parses the DSL program code generated by the LLM 222 into an abstract syntax tree. The abstract syntax tree provides an intermediate representation of the DSL program code in a tree structure that is easy to analyze and correct syntax errors. These syntax errors can include but are not limited to parsing errors, variable out-of-scope errors, and incorrect argument type errors. The AST tree structure represents statements, the parameters provided to each of these statements, and associated metadata included in the DSL program code. The specific implementation of the AST format can vary in different implementations.

FIG. 10 shows an example of DSL program code and FIG. 11 shows an example of the corresponding AST generated by the DSL to AST unit 302 by parsing the DSL program code shown in FIG. 10. The example shown in FIG. 10 is DSL program code for a slide presentation program that shows an example of inserting a shape into a slide, adding text, and formatting the text. The AST shown in FIG. 11 provides a tree structure representing the DSL code from FIG. 10 that facilitates code validation and correction. The example DSL code shown in FIG. 10 and the example AST shown in FIG. 11 provide examples of one possible DSL program code format and one possible AST format. Other implementations may utilize a different DSL program code format and/or a different AST format.

The code validation and correction unit 306 analyzes the AST to identify and correct errors in the syntax. In some implementations, the syntax of the DSL is defined in a markup language, such as but not limited to YAML, which includes descriptions of the statements supported, the parameters provided to each of these statements, and associated metadata. The application services platform 210 supports multiple applications in some implementations, and each application supported by the application services platform 210 is associated with its own syntax definition in some implementations. The code validation and correction unit 306 accesses the syntax definition for the application and compares the syntax in the AST with the syntax definition to identify syntax errors in the AST. The code validation and correction unit 306 corrects the syntax errors in the AST based on the syntax definition. These syntax errors can include but are not limited to parsing errors, variable out-of-scope errors, and in correct argument type errors.

The code validation and correction unit 306 can infer what the correct code should be from the AST due to the scoped design of the DSL. The scope of the DSL is intentionally limited to reduce the complexity of the language to increase program synthesis accuracy. The LLM 222 is more likely to generate syntactically correct program code when the syntax is less complex. Furthermore, the DSL sample datastore 228 is easier to create and maintain when the syntax definitions are kept less complex, because the number and complexity of DSL samples used to provide context to the LLM 222 is also reduced.

The code validation and correction unit 306 can use various code correction techniques to infer what the correct code should be in response to detecting an error. One technique is fuzzy enum matching for correcting errors in an enumerated type. An enumerated type includes a fixed set of possible values. The code validation and correction unit 306 can use a fuzzy matching technique to infer the correct enumerated type value from this fixed set of possible values from the incorrect enumerated type value detected in the AST. Another technique that the code validation and correction unit 306 can utilize is statement aliasing. The number of statements supported in the DSL is limited. The code validation and correction unit 306 can use fuzzy matching or other techniques to infer a valid DSL statement that is supported in the syntax definition from the incorrect statement included in the AST. Yet another technique that the code validation and correction unit 306 utilizes in some implementations is dismissible parameters removal. The code generated by the LLM 222 may inadvertently include one or more parameters that are not included in the syntax definition for a particular statement. The code validation and correction unit 306 discards these excess parameters. Another technique that the code validation and correction unit 306 utilizes in some implementations is statement injection. The code validation and correction unit 306 can utilize statement injection to detect that a statement is missing from the program code and add the missing statement to the AST. Yet another technique the code validation and correction unit 306 utilizes in some implementations is argument value correction. The code validation and correction unit 306 utilizes argument value correction in some implementations. The code validation and correction unit 306 can detect and correct argument values that are outside of the allowable range of values.

The code validation and correction unit 306 is configured to provide the AST to the client device 205 in response to the syntax checking unit 304 determining that there were no syntax errors or that the code validation and correction unit 306 has been able to correct the syntax errors that were corrected. Otherwise, if the code validation and correction unit 306 was unable to correct the syntax errors in the AST, the code validation and correction unit 306 sends an error notification to the client device 205 indicating that an error has occurred, and the user request could not be completed.

The client-side interface 212 includes an AST to backend-specific code unit 342, a backend-specific code execution unit 344, and an external service delegation unit 346. The AST to backend-specific code unit 342 implements a transpiler that takes the AST as an input and produces the equivalent source code in a programming language that can be executed on the client device 205. In some implementations, the AST to backend-specific code unit 342 is implemented on the application services platform 210 and the backend-specific source code. The specific back-end source code depends on the specific implementation of the client device 205. The back-end source code is an interpreted language in some implementations, such as but not limited to JavaScript. In other implementations, the back-end source code is a compiled language. The backend-specific code execution unit 344 implements an interpreter for interpreting and executing the backend-specific programming language for interpreted languages or a compiler for compiled languages that compiles and executes the program code. The execution of the backend-specific programming language causes the application to create and/or modify content to implement the user intent expressed in the natural language query submitted by the user in the application 214 on the client device 205.

The external service delegation unit 346 provides support for delegation statements in the DSL program code, which are then implemented in the backend-specific code unit 342. Delegation statements are DSL program statements that cause the client device 205 to obtain the services from an external service provider, such as the external services 240. The external services provider provides a service or services not implemented by the application services platform 210 but which would be useful to users of the application 214. The services supported are vetted in advance to ensure that they meet the data security, privacy, reliability, and/or other requirements of the application services platform 210 before adding statements utilizing these external services. In one non-limiting example, suppose that the application services platform 210 does not support text to image generation, but an external service provides an image generation service that has been vetted and meets the requirements of the administrators of the application services platform 210. The DSL syntax can be updated to include a delegation statement, which when implemented in the backend-specific code, implements the program code necessary to facilitate sending a request to the external service for receiving any expected result from the request. A technical benefit of the use of such delegation statements is that such statements provide a powerful tool for extending the functionality of the application services platform 210 through the use of simple statements that can be easily incorporated into the DSL program code output by the LLM 222. In some implementations, the content generated by the external services is forwarded to the application services platform 210 for analysis by the content moderation services 216 prior to providing the content generated by the external services to the application 214 to filter out any potentially objectionable or offensive content.

Figure 4:
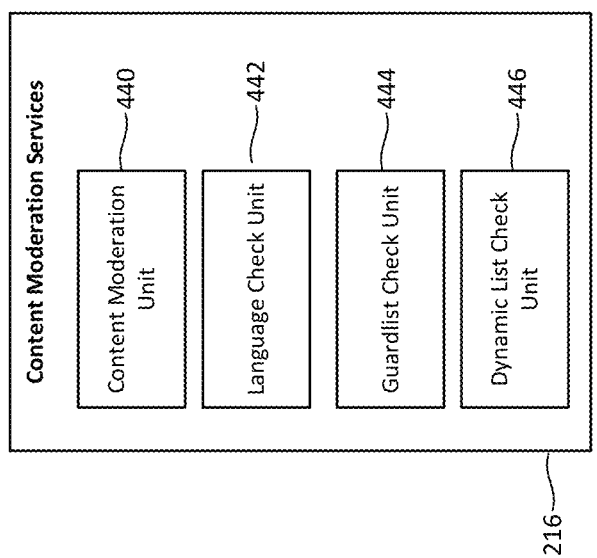
FIG. 4 is a diagram showing additional features of the content moderation services of the application services platform shown in FIG. 2.

FIG. 4 is a diagram showing an example implementation of content moderation services 216 shown in FIG. 2. The content moderation services 216 analyze content provided by the user, content generated by the LLM 222, and/or content generated by the external services 240 to ensure that potentially objectionable or offensive content is not generated or modified by the application services platform 210. The content moderation services 216 analyzes the natural language query, existing document content including the document context information, the DSL program code, and any other content received from the application 214 or generated by the LLM 222, the external services, and/or other generative models utilized by the application services platform 210. If potentially objectionable or offensive content is detected, the content moderation services 216 provides a blocked content notification to the client device 205.

The content moderation services 216 performs several types of checks on the content provided by the user, content generated by the LLM 222, and/or content generated by the external services 240. The content moderation unit 440 is implemented by a machine learning model trained to analyze the textual inputs to perform a semantic analysis on the content to predict whether the content include potentially offensive language. The language check unit 442 performs another check on the content using a second model configured to analyze the words and/or phrase used in textual content to identify potentially offensive language. The guard list check unit 444 is configured to compare the language used in the content with a list of prohibited terms including known offensive words and/or phrases. The dynamic list check unit 446 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guard list as the guard list is updated. The specific checks performed by the content moderation services 216 may vary from implementation to implementation. If one or more of these checks determines that the content provided by the user, the content generated by the LLM 222, and/or the content generated by the external services 240 includes offensive content, the content moderation services 216 can notify the application services platform 210 that some action should be taken. In some implementations, the content moderation services 216 generates a blocked content notification, which is provided to the client device 205. The client-side interface 212 receives the notification and causes the application 214 to present a message on a user interface of the application that the natural language query entered by the user could not be processed. The user interface provides information indicating why the blocked content notification was issued in some implementations. The user may attempt to refine and resubmit the natural language query in response to the notification. A technical benefit of this approach is that the content moderation services 216 provides safeguards against both user-created and model-created content to ensure that prohibited offensive or potentially offensive content is not included in the presentation.

Figure 5:
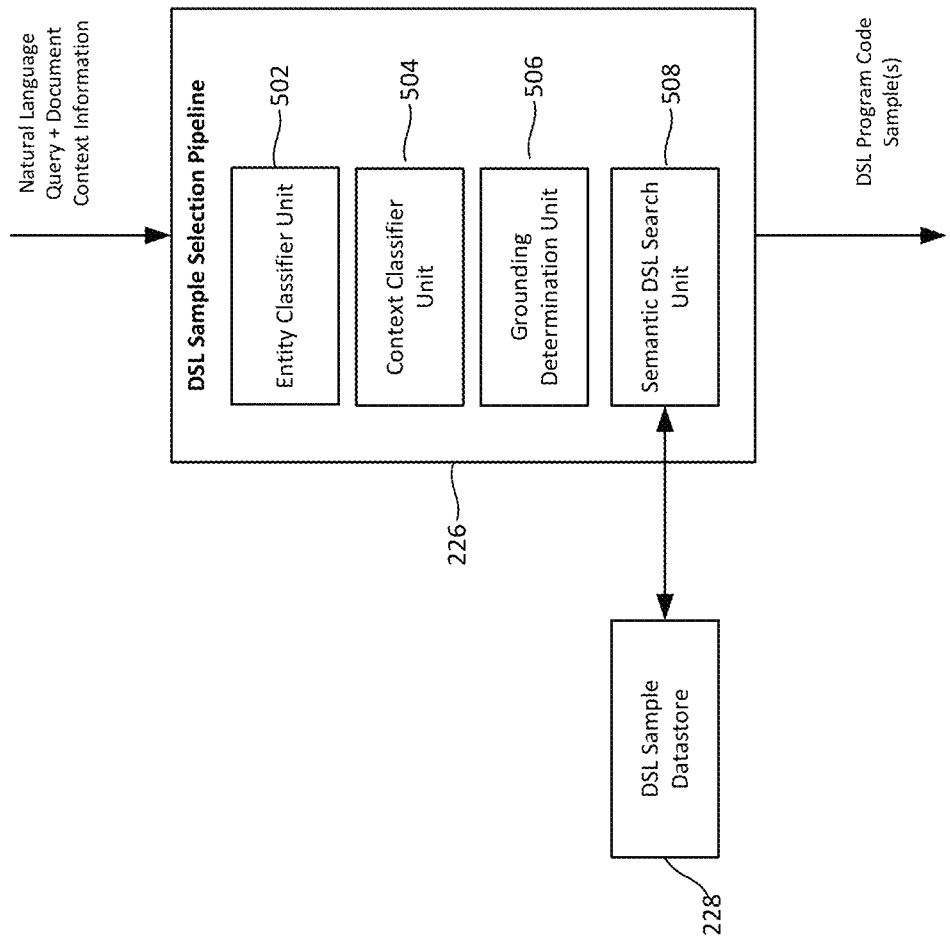
FIG. 5 is a diagram showing additional features of the DSL sample selection pipeline of the application services platform shown in FIG. 2.

FIG. 5 is an example implementation of the DSL sample selection pipeline 226 shown in FIG. 2. The DSL sample selection pipeline 226 identifies DSL samples in the DSL sample datastore 228 that can be included in the prompt provided to the LLM 222 to provide the LLM 222 with some context as to what the DSL program code to be generated in response to the natural language query should look like. The DSL sample selection pipeline 226 includes an entity classifier unit 502, a context classifier unit 504, a grounding determination unit 506, and a semantic DSL search unit 508. A technical problem associated with many LLMs is that the LLMs have a limited number of tokens that can be included in the prompt. Therefore, it is not possible to include all possible DSL program code samples in the prompt to the LLM. The DSL sample selection pipeline 226 provides a technical solution to this problem by providing a multi-tiered approach for selecting the most appropriate DSL program code samples from the DSL sample datastore 228 to include in the prompt to the LLM 222.

The entity classifier unit 502 analyzes the natural language query and/or the document context and associates the natural language query with entities supported by the application 214. The natural language query may be associated with multiple entities on which actions may be taken within the application 214. Furthermore, the specific entities supported may vary from application to application. In a non-limiting example, the application 214 is a presentation application, and the supported entities include presentation, slide, text, image, and shape. In another non-limiting example, the application 214 is a word processing application, and the entities include a document, table, text, title, and shape. The natural language query input by the user may reference more than one of these entities and the corresponding prompt to the LLM 222 generated based on the natural language query will include DSL program code samples that utilize these entities. In some implementations, the entity classifier unit 502 utilizes a classifier model that is configured to analyze the textual content of the natural language query and/or the document context to identify classes of entity referenced therein. In implementation in which the application services platform 210 supports multiple types of applications, the classifier model is provided with an indictor of the application type as an input so that the model knows which classes of entities can be selected. The output of the entity classifier unit 502 is used to aid the context classifier unit 504 and the semantic DSL search unit 508.

The context classifier unit 504 determines whether a given natural language query requires the current document context in order to fulfill the user intent expressed in the query. As discussed in the preceding examples, the current document context may be required where the natural language query has requested that existing content be modified, that new content be generated based on the existing content, and/or that new content be generated and added to existing content. The context classifier unit 504 utilizes a classifier model to predict whether the natural language query requires the current document context. The classifier model is implemented by the LLM 222 in some implementations and by a separate LLM in other implementations. Many natural queries require knowledge of the current document context in order for the LLM 222 to generate appropriate DSL program code. The natural language query may specify a change or changes to the layout of a slide and/or changes to the content of a slide that require knowledge of the current layout and/or contents of the slide. The context classifier unit 504 uses chain-of-thought prompting to elicit reasoning from the classifier that indicates why the classifier has predicted that the natural language query requires document context. A technical benefit of this approach is that accuracy of the predictions by the classifier model can be improved by utilizing the chain-of-thought prompting, because the classifier model associates prior assumptions as the model analyzes each element of the natural language query before concluding whether the natural language query requires document context. The context classifier 504 outputs an indication on whether the natural language query requires the document context. This indication is used by the semantic DSL search unit 508 to select appropriate DSL program code samples and by the prompt construction unit 220 to determine whether to include the document content information in the prompt to be provided to the LLM 222.

The grounding determination unit 506 determines whether the natural language query requires grounding. LLMs may hallucinate when generating content that was not included in the training data for the LLM. The grounding determination unit 506 utilizes a grounding determination model to predict whether the natural language query and/or the document context references any entities that would benefit from grounding. The grounding determination model identifies entities, such as but not limited to topics, people, events, and/or other entities referenced in the natural language query or in the document context information for which factual information may be acquired and provided to the LLM 222 to reduce the likelihood of the model hallucinating incorrect information about these entities. The grounding determination model generates a prediction whether grounding is required and provides that information to the DSL search unit 508, which can use this information to include samples of DSL program code that include delegation statements to be executed by the prompt construction unit 220 to obtain the grounding information.

The semantic DSL search unit 508 identifies sample DSL program code in the DSL sample datastore 228 to be provided to the LLM 222 as part of the prompt generated by the prompt construction unit 220. The DSL sample datastore 228 includes sample query-program code example pairs. The DSL sample datastore 228 includes DSL program code examples for each of the types of entities that may be identified by the entity classifier unit 502 and may also include DSL program code samples that include delegation statements for obtaining grounding information. The DSL program code examples can also include document context information if necessary for the natural language query. The queries associated with the DSL program code samples have been normalized in some implementations. This normalization includes one or more of: (1) changing all generative actions to "add" actions, (2) changing all reformatting actions to "change" actions, and (3) changing all descriptive keywords to generic descriptions. All add, insert, create, and other such generative actions are normalized to "add" statements in the example queries. Reformatting actions, such as change, modify, turn, and other such reformatting actions are changed to "change" statements in the example queries. The descriptive keywords or adjectives are replaced with generic descriptions, such as but not limiting to references to a specific topic to the generic "a given topic", references to specific colors to "a given color", references to properties to "a given property", and/or references to a specific style to "a given style". A technical benefit of this normalization process is that the sample queries are matched on semantic similarities rather than simply matching words found in the natural language query. Each of the normalized sample queries are then encoded to by an LLM-based encoder E, which may be provided by the LLM 222. A normalized query $\bar{b}_i$ from the sample bank B of n samples is encoded into a vector $E(\bar{b}_i)$ in the embedding space, where $i=1 \ldots n(B)$. The embeddings are indexed and cached in the DSL sample datastore 228.

The semantic DSL search unit 508 calculates the embeddings embedding $E(q)$ for the natural language query q input by the user. The semantic DSL search unit 508 calculates a vector similarity score that reflects a similarity between the of the natural language query q input by the user and each $E(b_i)$. The semantic DSL search unit 508 calculates the cosine similarity score $s_i$ between $E(q)$ and each $E(b_i)$ by taking the inner product $s_i=E(\bar{b}_i)^T E(q)$ before proceeding to the dynamic selection of the DSL program samples to be output by the DSL sample selection pipeline 226 to provide to the prompt construction unit 220. While the implementations of the semantic DSL search unit 508 discussed herein calculates a cosine similarity score $E(q)$ and each $E(b_i)$ as discussed above, other implementations of the semantic DSL search unit 508 utilizes another vector similarity scores.

The semantic DSL search unit 508 implements a dynamic selection algorithm to select the top N relevant DSL program code samples for the natural language query. The selection algorithm to retrieve the top-N relevant samples into the collection R, where N is an integer value. The value of N may vary from implementation to implementation and may depend at least in part on the prompt size that LLM 222 used in that implementation can support. Implementation in which the LLM 222 can support larger prompt sizes can include a greater number of DSL program code samples in the prompt to help guide the LLM 222 in generating the DSL program code based on the natural language query.

The dynamic selection algorithm includes a first operation of sorting the samples based on their similarity scores. In the sorting operation S, where $S=\{s_1 \ldots s_{n(B)}\}$ in the which the similarity scores are sorted in descending order. Accordingly, the samples are sorted from most relevant to least relevant.

The dynamic selection algorithm includes a second operation of partitioning the sorted sample based on their respective entity category. Partition S into $\cup S^k$ where k denotes the entity category. Each of the samples include DSL code that operates on a particular entity. The samples are separated based on entity to facilitate selection of the most relevant samples for each category of entity in the natural language query. This approach ensures that the DSL program code samples included in the prompt to the LLM 222 include sample code for each type of entity included in the natural language query.

The dynamic selection algorithm includes a third operation of selecting the samples for each respective entity category. This operation can be represented as: for each $k \in K(q)$, $S^k=\{s_1^k \ldots s_N^k\}$ where $K(q)$ is the output of the entity classifier, select $b_i$ where $E(\bar{b}_i)^T E(q)=s_1^k$ (the highest score in $S^k$) to add into R. If b is already in R, use the one associated with the next highest score in $S^k$.

The dynamic selection algorithm includes a fourth operation of continuing to add additional samples to the collection R until N samples have been added to the collection. The fourth operation can be expressed as: If n(R)<N, continue adding sample $b_j$ with the next highest $s_j$ score in S where $b_j \notin R$ until n(R)=N. The dynamic selection algorithm continues to select samples that are most relevant once at least one sample has been selected for each entity category.

The dynamic selection algorithm includes a fifth operation of reversing the order of the samples in the collection R. As a result of the fifth operation, the sample program code having the highest relevance score comes at the end of the collection and will come at the end of the sample DSL program code included in the prompt to the LLM 222. A technical benefit of this approach is that the correctness of the DSL program code output by the LLM 222 is improved by ordering the samples in the prompt in this manner. The DSL program code samples are then provided as an input to the prompt construction unit 220.

Figure 6:
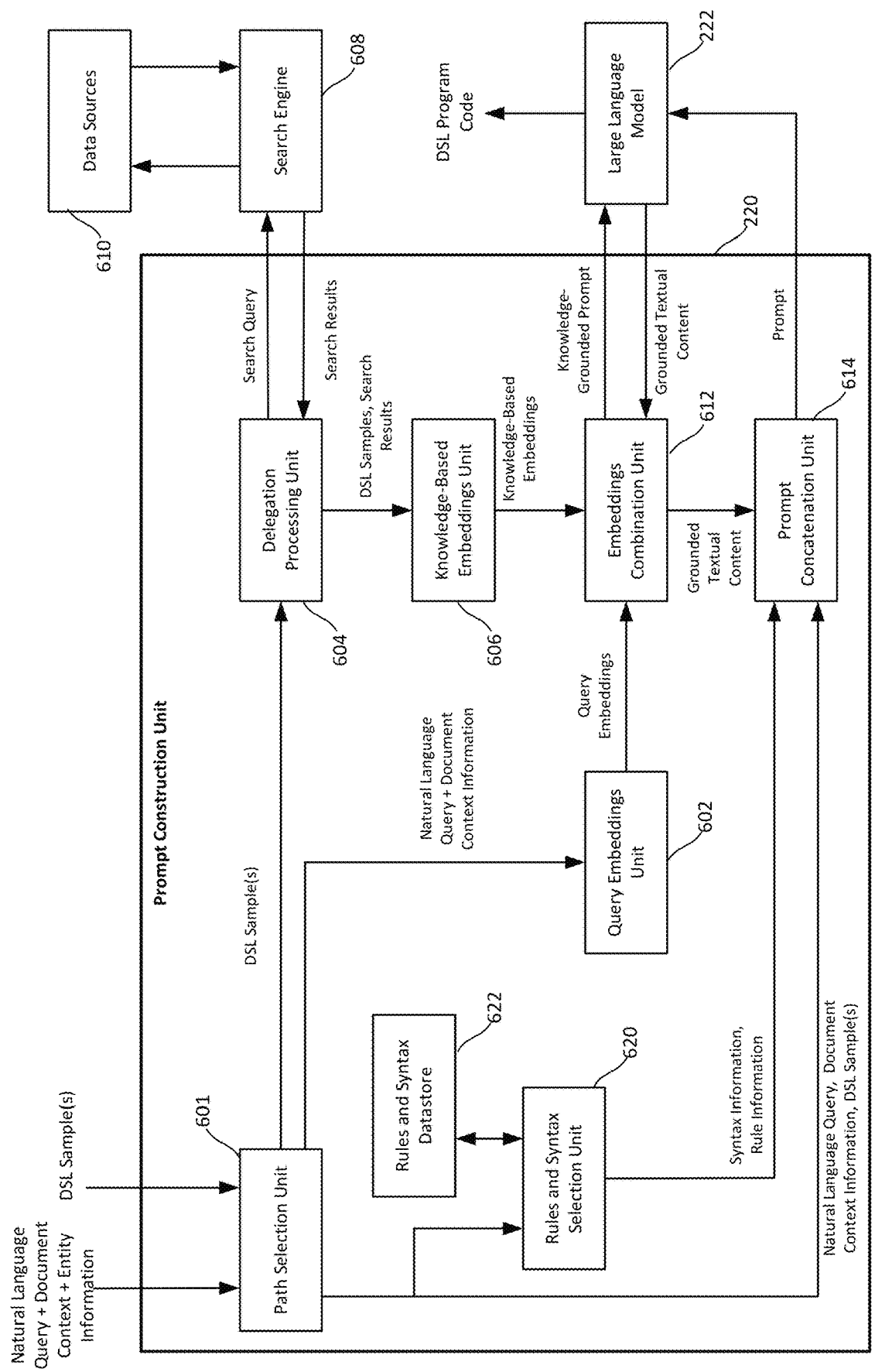
FIG. 6 is a diagram showing additional features of the prompt construction unit of the application services platform shown in FIG. 2.

FIG. 6 is an example implementation of the prompt construction unit 220 shown in FIG. 2. The prompt construction unit 220 creates the prompt that will be provided as an input to the LLM 222. The prompt construction unit 220 receives the DSL sample or samples selected by the DSL sample selection pipeline 226. The prompt construction unit 220 also receives the natural language query as an input and the document context information (where available) as inputs.

The natural the natural language query as an input and the document context information (if available) obtained from the client device 205 and the DSL samples output by the DSL sample selection pipeline 226 are provided as inputs to the path selection unit 601 of the prompt construction unit 220. The path selection unit 601 selects a first path if no grounding is required and a second path if grounding is required.

On the first path, the path selection unit 601 provides the natural language query, the document context information, and the DSL program code samples to the prompt concatenation unit 614. The path selection unit 601 provides the entity information obtained from the entity classifier unit 502 of the DSL sample selection pipeline 226 to the rules and syntax selection unit 620. The rules and syntax selection unit 620 obtains the syntax description for each of the entities from the rules and syntax datastore 220. The rules and syntax datastore 220 includes the DSL syntax information for each of the entities that may be included in the DSL code and any rules or guidelines associated with those entities. As discussed in the preceding examples, the syntax description for each of the entities provides statement usage examples and comments describing what the DSL statements are achieving. Furthermore, the rules and/or guideline information (collectively referred to as rules information) provides additional information to the LLM 222 regarding how the particular DSL statements are to be used, which reduces the likelihood that the LLM 222 will hallucinate and generate invalid DSL program code. The rules and syntax selection unit 620 provides the DSL statement information and the rules information to the prompt concatenation unit 614 as another input. The prompt concatenation unit 614 concatenates the natural language query, the document context information (if provided), the DSL code samples, the DSL syntax samples, and the rules information into a prompt. The prompt is provided the LLM 222, which generates the DSL program code.

On the second path, the path selection unit 601 provides the DSL program code sample or samples selected by the DSL sample selection pipeline 226 to the delegation processing unit 604. The DSL sample program code includes delegation statements where the natural language query refers to factual information that requires grounding. The delegation processing unit 604 executes these delegation statements by submitting a search query to the search engine 608. The search query searches for factual information associated with one or more entities references in the natural language query or the document context information for which factual information may be acquired and provided to the LLM 222 to reduce the likelihood of the model hallucinating incorrect information about these entities. The search engine 608 is implemented using Microsoft Bing® in some implementations. Other implementation may utilize other search engines. The search engine 608 searches for information from one or more data sources 610. The one or more data sources 610 can include web-based content, enterprise-specific datastores, and/or other sources of information. The search engine 608 provides the search results to the delegation processing unit 604, and the delegation processing unit 604 provides the search results to the knowledge-based embeddings unit 606.

The knowledge-based embeddings unit 606 analyzes the search results to generate embeddings for each of the search results. The search results are partitioned into segments, which are then analyzed to generate embeddings. The knowledge-based embeddings unit 606 takes the top N results provided by the search engine 608 in some implementations and segments the search results, wherein N is a positive integer. The value of N may be determined at least in part by the prompt size of the LLM 222. Fewer search results may be selected in instances where the prompt size is smaller, while more search results may be selected instances where the prompt size is larger. The search results are partitioned into smaller segments prior to embedding, because may search results may include filler information that is not particular relevant to the natural language query, and these irrelevant segments can be filtered out in the subsequent processing steps. The knowledge-based embeddings unit 606 utilizes the same LLM-based encoder that the semantic DSL search unit 508 to generate the embeddings. The embeddings are provided to the embeddings combination unit 612.

The query embeddings unit 602 receives the natural language query and the document context information (if any) as inputs and determines the embeddings for these inputs. The query embeddings unit 602 utilizes the same LLM-based encoder that the semantic DSL search unit 508 and the knowledge-based embeddings unit 606 used to generate the embeddings. The embeddings are provided to the embeddings combination unit 612.

The embeddings combination unit 612 receives the query embeddings and the knowledge-based embeddings and generates a knowledge-grounded prompt to the LLM 222. The knowledge-grounded prompt is used to generate grounded textual content that can be included in the prompt to the LLM that generates the sample DSL program code. The embeddings combination unit 612 ranks the knowledge-based embeddings by comparing the knowledge-based embeddings to the query embeddings. The knowledge-based embeddings most relevant to the query embeddings are selected for inclusion in the knowledge-grounded prompt. The embeddings combination unit 612 determines this embedding by determining the cosine similarity scores for the each of the knowledge-based embeddings to the query embeddings. Those knowledge-based embeddings that are closest to the query embeddings in the embedding space are selected for inclusion in the knowledge-grounded prompt. The knowledge-grounded prompt is used to generate factually grounded content that will be included in the DSL program code that is to be generated by the LLM 222. A technical benefit of this approach is that reduces the likelihood that the LLM 222 will hallucinate factually incorrect information to be included in the DSL program code output by the model by giving the model factually correct information as context when generating the DSL program code. The grounded textual content generated by the LLM 222 is provided to the prompt concatenation unit 614 as an input. This grounded textual content is only provided to the prompt concatenation unit 614 where the path selection unit 601 determines that the natural language query and/or the document context information requires grounding. The prompt concatenation unit 614 then concatenates the natural language query, the document context information (if any), the DSL program code sample or samples, and the grounded textual content into the prompt to be provided to the LLM 222 to cause the LLM 222 to generate the DSL program code that includes knowledge-grounded information.

Figure 7A:
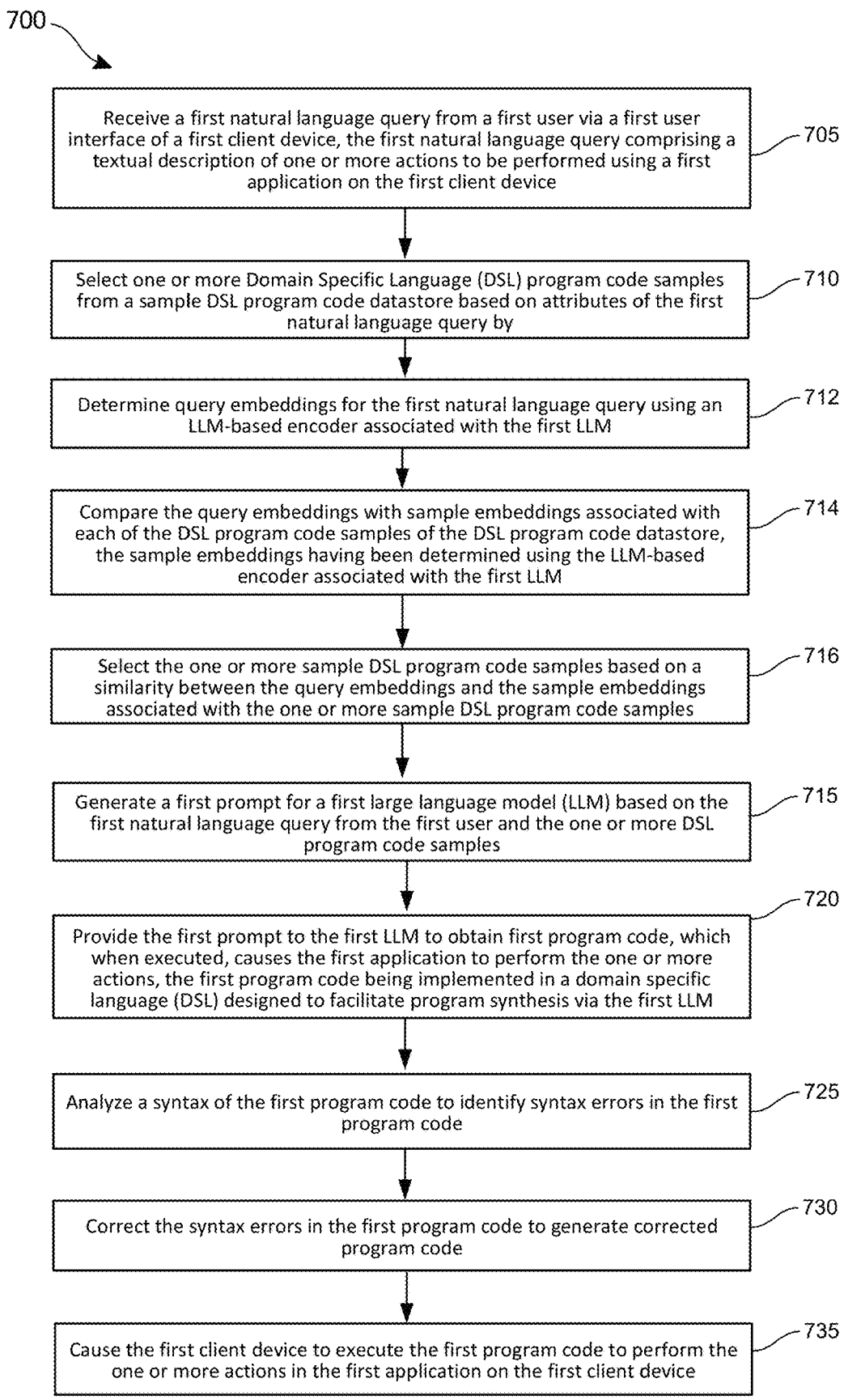
FIG. 7A is a flow chart of an example process for providing natural language commands in an application according to the techniques disclosed herein.

FIG. 7A is an example flow chart of an example process 700 for providing natural language commands in an application. The process 700 can be implemented by the application services platform 210 shown in the preceding examples.

The process 700 includes an operation 705 of receiving a first natural language query from a first user via a first user interface of a first client device 205. The first natural language query includes a textual description of one or more actions to be performed using a first application 214 on the first client device 205. As discussed in the preceding examples, the user may enter natural language queries that includes commands that cause the application 214 to create and/or modify electronic content in the application 214. A technical benefit of this approach is that the user does not have to navigate through a complex user interface and can instead communicate with the application using natural language to cause the application to implement the user's intent.

The process 700 includes an operation 710 of selecting one or more DSL program code samples from a sample DSL program code datastore based on attributes of the first natural language query. The operation 705 includes an operation 712 of determining query embeddings for the first natural language query using an LLM-based encoder associated with the first LLM, an operation 714 of comparing the query embeddings with sample embeddings associated with each of the DSL program code samples of the DSL program code datastore, the sample embeddings having been determined using the LLM-based encoder associated with the first LLM, and an operation 716 of selecting the one or more sample DSL program code samples based on a similarity between the query embeddings and the sample embeddings associated with the one or more sample DSL program code samples. The DSL sample selection pipeline 228 selects the DSL samples.

The process 700 includes an operation 715 of generating a first prompt for a first large language model (LLM) based on the first natural language query from the first user and the one or more DSL program code samples. As discussed in the preceding examples, the application services platform 210 analyzes the natural language query and document content information (if modifying existing content), identifies sample DSL program code that implements the user intent expressed in the natural language query and the document content information, and provides the prompt to the LLM 222. The application services platform 210 also includes grounding information in the prompt if the natural language query includes generating content that has a factual basis. The prompt construction unit 220 generates the prompt to be provided to the LLM 222.

The process 700 includes an operation 720 of providing the first prompt to the first LLM to obtain a first program code, which when executed, causes the first application to perform the one or more actions. The first program code is implemented in a domain specific language (DSL). The LLM 222 generates the DSL program code that implements in the first application 214 the user intent expressed in the natural language query.

The process 700 includes an operation 725 of analyzing a syntax of the first program code to identify syntax errors in the first program code and an operation 730 of correcting the syntax errors in the first program code to generate corrected program code. In some implementations, the DSL program code is translated to an AST. In some implementations, the DSL program code is translated to the AST on the application services platform. In other implementations, the AST is generated by the client-side interface 212 of the client device 205.

The process 700 includes an operation 735 of causing the first client device to execute the first program code to perform the one or more actions in the first application on the first client device. The AST or other intermediate representation of the DSL program code is translated by a transpiler into platform-specific program code that can be executed on the client device 205. The platform-specific program code causes the application 214 to perform one or more actions to create and/or modify content. These actions implement the user intent that was expressed in the natural language query.

Figure 7B:
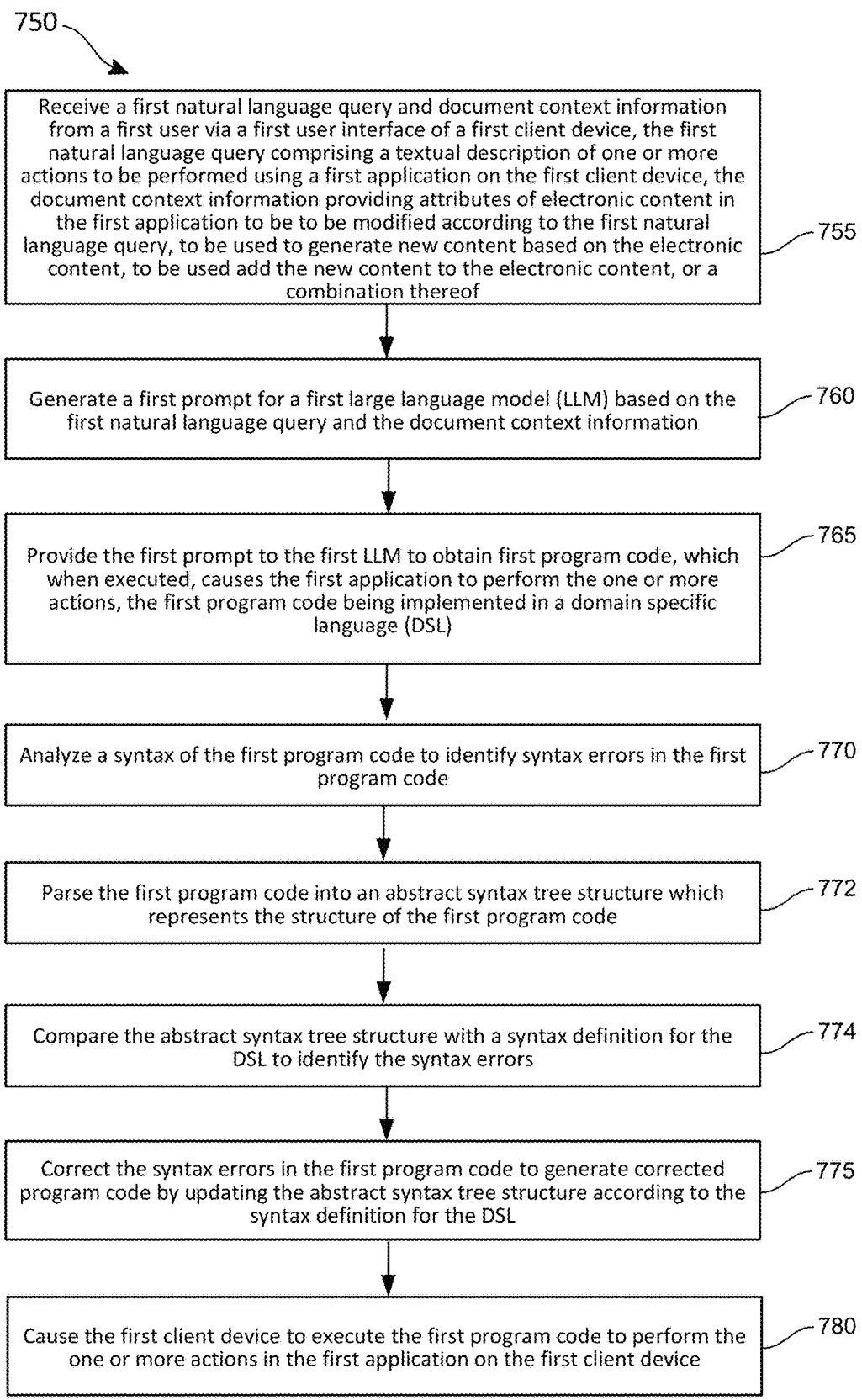
FIG. 7B is a flow chart of another example process for providing natural language commands in an application according to the techniques disclosed herein.

FIG. 7B is a flow chart of another example process 750 for providing natural language commands in an application. The process 750 can be implemented by the application services platform 210 shown in the preceding examples.

The process 700 includes an operation 755 of receiving a first natural language query and document context information from a first user via a first user interface of a first client device 205. The first natural language query includes a textual description of one or more actions to be performed using a first application 214 on the first client device 205. As discussed in the preceding examples, the user may enter natural language queries that includes commands that cause the application 214 to create and/or modify electronic content in the application 214. As discussed in the preceding examples, the document context information provides attributes of electronic content in the first application to be to be modified according to the first natural language query, to be used to generate new content based on the electronic content, to be used add the new content to the electronic content, or a combination thereof. A technical benefit of this approach is that the user does not have to navigate through a complex user interface and can instead communicate with the application using natural language to cause the application to implement the user's intent.

The process 700 includes an operation 760 of generating a first prompt for a first large language model (LLM) based on the first natural language query and the document context information. As discussed in the preceding examples, the application services platform 210 analyzes the natural language query and document content information (if modifying existing content), identifies sample DSL program code that implements the user intent expressed in the natural language query and the document content information, and provides the prompt to the LLM 222. The application services platform 210 also includes grounding information in the prompt if the natural language query includes generating content that has a factual basis.

The process 700 includes an operation 765 of providing the first prompt to the first LLM to obtain a first program code, which when executed, causes the first application to perform the one or more actions, the first program code being implemented in a domain specific language (DSL). The LLM 222 generates the DSL program code that implements in the first application 214 the user intent expressed in the natural language query.

The process 700 includes an operation 770 of analyzing a syntax of the first program code to identify syntax errors in the first program code. The operation 770 includes an operation 772 of parsing the first program code into an abstract syntax tree structure which represents the structure of the first program code and an operation 774 of comparing the abstract syntax tree structure with a syntax definition for the DSL to identify the syntax errors. The process 700 includes an operation 770 of an operation 775 of correcting the syntax errors in the first program code to generate corrected program code by updating the abstract syntax tree structure according to the syntax definition for the DSL. In some implementations, the DSL program code is translated to an AST. In some implementations, the DSL program code is translated to the AST on the application services platform 210. In other implementations, the AST is generated by the client-side interface 212 of the client device 205.

The process 700 includes an operation 775 of causing the first client device to execute the first program code to perform the one or more actions in the first application on the first client device. The AST or other intermediate representation of the DSL program code is translated by a transpiler into platform-specific program code that can be executed on the client device 205. The platform-specific program code causes the application 214 to perform one or more actions to create and/or modify content. These actions implement the user intent that was expressed in the natural language query.

The detailed examples of systems, devices, and techniques described in connection with FIGS. 1-7B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
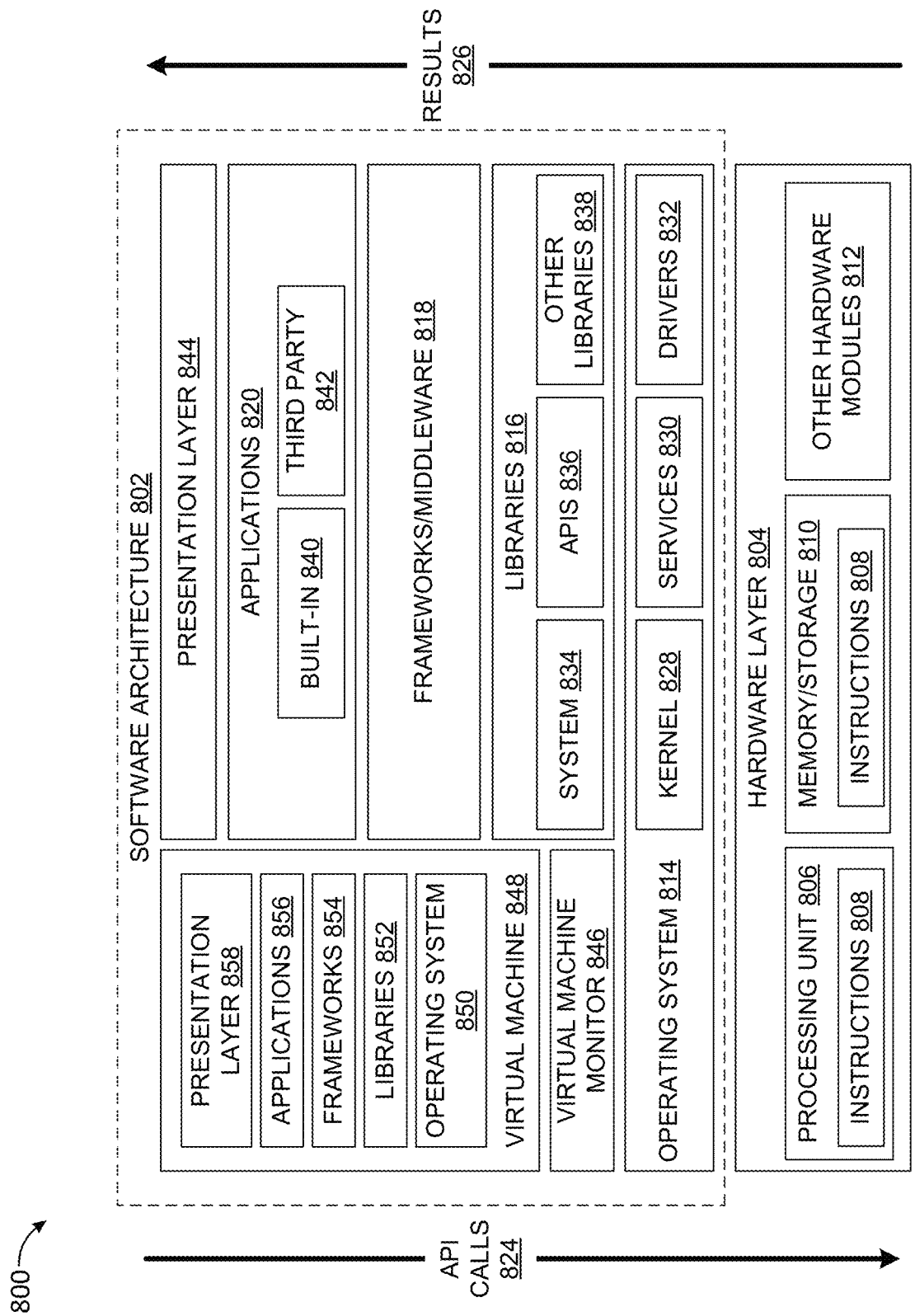
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
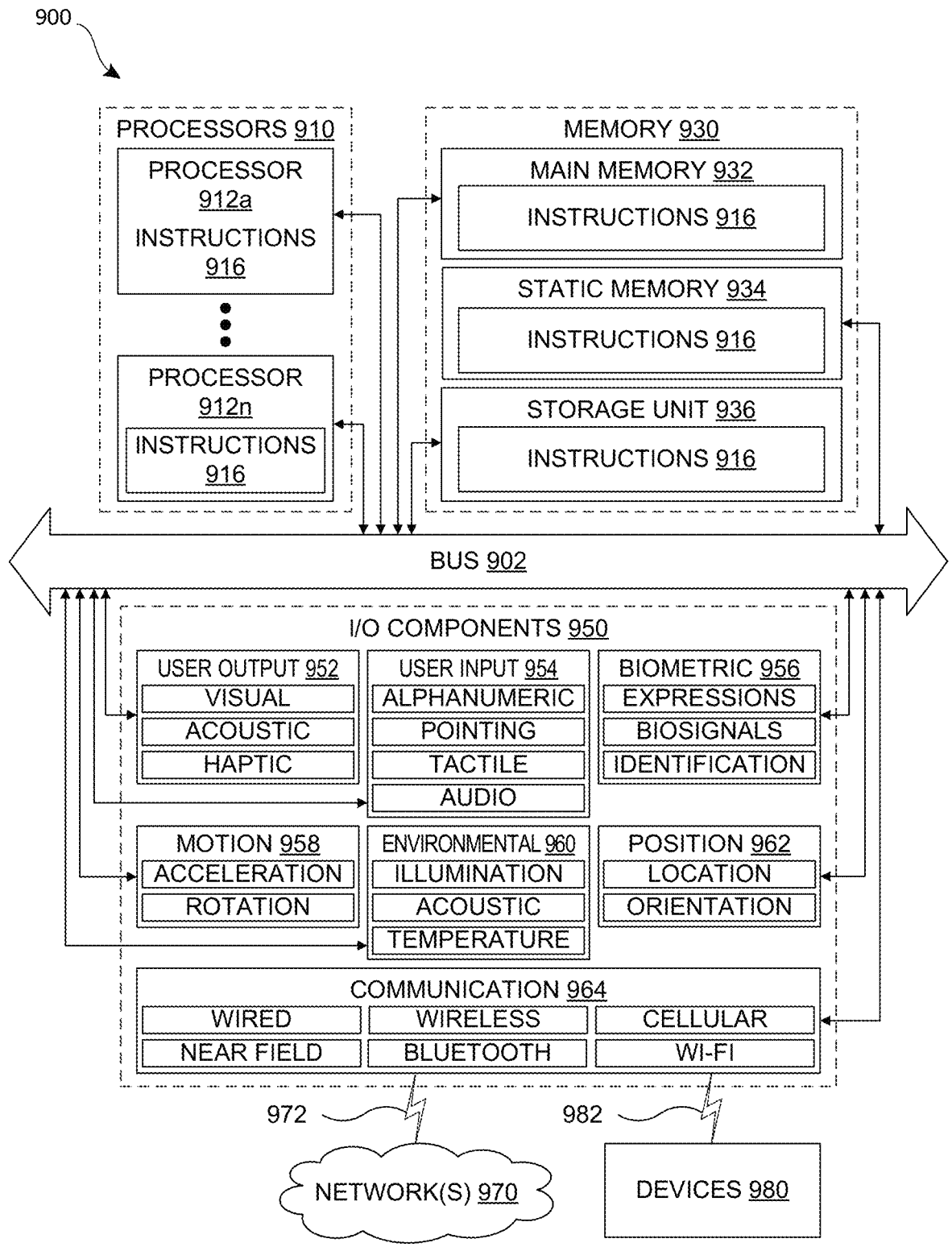
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:
1. A data processing system comprising:
a processor; and
a machine-readable medium storing executable instructions that, when executed, cause the processor alone or in combination with other processors to perform operations comprising:
receiving a first natural language query from a first user via a first user interface of a first client device, the first natural language query comprising a textual description of one or more actions to be performed using a first application on the first client device;
selecting one or more Domain Specific Language (DSL) program code samples from among a plurality of DSL program code samples of a sample DSL program code datastore based on attributes of the first natural language query by:

determining query embeddings for the first natural language query using a large-language model-based encoder associated with a first large language model, comparing the query embeddings with sample embeddings associated with each DSL program code sample of the one or more DSL program code samples of the sample DSL program code datastore, the sample embeddings having been determined using the large-language model-based encoder associated with the first large language model, ranking the one or more DSL program code samples based on their respective vector similarity scores to generate ranked DSL program code samples, partitioning the ranked DSL program code samples into a plurality of groups based on an entity category associated with each DSL program code sample of the ranked DSL program code samples, the entity category representing an entity on which the first application can perform an action, analyzing the first natural language query using a classifier model trained to identify and output a set of entity categories associated with the first natural language query, and selecting one or more DSL program code samples associated with each entity category in the set of entity categories output by the classifier model;

generating a first prompt for the first large language model based on the first natural language query from the first user and the one or more DSL program code samples;

providing the first prompt to the first large language model to obtain a first program code, which when executed, causes the first application to perform the one or more actions, the first program code being implemented in a domain specific language;

analyzing a syntax of the first program code to identify syntax errors in the first program code;

correcting the syntax errors in the first program code to generate corrected program code; and causing the first client device to execute the first program code to perform the one or more actions in the first application on the first client device.

2. The data processing system of claim 1, wherein comparing the query embeddings with sample embeddings associated with each DSL program code sample of the one or more DSL program code samples of the sample DSL program code datastore further comprises:

determining a cosine similarity score between the query embeddings and each of the sample embeddings to determine how similar the first natural language query is to each DSL program code sample of the one or more DSL program code samples.

3. The data processing system of claim 1, wherein analyzing the syntax of the first program code to identify syntax errors in the first program code further comprises:

parsing the first program code into an abstract syntax tree structure which represents a structure of the first program code; and comparing the abstract syntax tree structure with a syntax definition for the domain specific language to identify the syntax errors, wherein correcting the syntax errors in the first program code to generate corrected program code comprises updating the abstract syntax tree structure according to the syntax definition for the domain specific language.

4. A data processing system comprising:

a processor; and a machine-readable medium storing executable instructions that, when executed, cause the processor alone or in combination with other processors to perform operations comprising:

receiving a first natural language query from a first user via a first user interface of a first client device, the first natural language query comprising a textual description of one or more actions to be performed using a first application on the first client device;

selecting one or more Domain Specific Language (DSL) program code samples from among a plurality of DSL program code samples of a sample DSL program code datastore based on attributes of the first natural language query by:

determining query embeddings for the first natural language query using a large language model-based encoder associated with a first large language model, comparing the query embeddings with sample embeddings associated with each DSL program code sample of the plurality of DSL program code samples, the sample embeddings having been determined using the large language model-based encoder associated with the first large language model, and selecting the one or more DSL program code samples from among the plurality of DSL program code samples based on a similarity between the query embeddings and the sample embeddings associated with the one or more DSL program code samples;

generating a first prompt for the first large language model based on the first natural language query from the first user and the one or more DSL program code samples;

providing the first prompt to the first large language model to obtain a first program code, which when executed, causes the first application to perform the one or more actions, the first program code being implemented in a domain specific language;

analyzing a syntax of the first program code to identify syntax errors in the first program code by parsing the first program code into an abstract syntax tree structure which represents a structure of the first program code and comparing the abstract syntax tree structure with a syntax definition for the domain specific language to identify the syntax errors;

correcting the syntax errors in the first program code to generate corrected program code by updating the abstract syntax tree structure according to the syntax definition for the domain specific language; and causing the first client device to execute the first program code to perform the one or more actions in the first application on the first client device including providing the abstract syntax tree structure to the first client device to cause the first client device to transpile the abstract syntax tree structure into platform-specific program code suitable for execution on the first client device and execute the platform-specific program code to cause the first application to perform the one or more actions described in the first natural language query.

5. A data processing system comprising:
a processor; and
a machine-readable medium storing executable instructions that, when executed, cause the processor alone or in combination with other processors to perform operations comprising:
  receiving a first natural language query from a first user via a first user interface of a first client device, the first natural language query comprising a textual description of one or more actions to be performed using a first application on the first client device;
  selecting one or more Domain Specific Language (DSL) program code samples in a domain specific language from among a plurality of DSL program code samples of a sample DSL program code datastore based on attributes of the first natural language query by:
    determining query embeddings for the first natural language query using a large language model-based encoder associated with a first large language model,
    comparing the query embeddings with sample embeddings associated with each DSL program code sample of the sample DSL program code datastore, the sample embeddings having been determined using the large language model-based encoder associated with the first large language model, and
    selecting the one or more DSL program code samples from among the plurality of DSL program code samples based on a similarity between the query embeddings and the sample embeddings associated with the one or more DSL program code samples;
  generating a first prompt for the first large language model based on the first natural language query from the first user and the one or more DSL program code samples, wherein generating the first prompt for the first large language model further comprises:
    analyzing the first natural language query with a grounding determination model that is trained to analyze the first natural language query and output an indication whether the first natural language query requires factual grounding;
    generating a search query based on the first natural language query responsive to the grounding determination model outputting an indication that the first natural language query requires factual grounding;
    providing the search query to a search engine to cause the search engine to execute the search query and obtain search results;
    summarizing the search results into grounded textual content; and
    concatenating the first natural language query, the one or more DSL program code samples, and the grounded textual content;
  providing the first prompt to the first large language model to obtain a first program code, which when executed, causes the first application to perform the one or more actions, the first program code being implemented in the domain specific language;
  analyzing a syntax of the first program code to identify syntax errors in the first program code;
  correcting the syntax errors in the first program code to generate corrected program code; and
  causing the first client device to execute the first program code to perform the one or more actions in the first application on the first client device.

6. The data processing system of claim 5, wherein summarizing the search results into grounded textual content further comprises:
  determining query embeddings for the first natural language query using the large language model-based encoder associated with the first large language model;
  partitioning the search results into a plurality of segments;
  determining knowledge-based embeddings for each of the plurality of segments of the search results;
  comparing the query embeddings with the knowledge-based embeddings to determine a similarity score for each knowledge-based embedding of the knowledge-based embeddings;
  ranking the knowledge-based embeddings based on the similarity score;
  selecting a subset of the knowledge-based embeddings;
  combining the query embeddings and the knowledge-based embeddings into a second prompt for the first large language model;
  providing the second prompt to the first large language model to obtain grounded textual content; and
  adding the grounded textual content to the first prompt to be provided to the first large language model.

7. A data processing system comprising:
a processor; and
a machine-readable medium storing executable instructions that, when executed, cause the processor alone or in combination with other processors to perform operations comprising:
  receiving a first natural language query, and document context information from a first user via a first user interface of a first client device, the first natural language query comprising a textual description of one or more actions to be performed using a first application on the first client device, the document context information providing attributes of electronic content in the first application to be to be modified according to the first natural language query, to be used to generate new content based on the electronic content, to be used add the new content to the electronic content, or a combination thereof;
  selecting one or more Domain Specific Language (DSL) program code samples in a domain specific language from among a plurality of DSL program code samples of a sample DSL program code datastore based on attributes of the first natural language query by:
    determining query embeddings for the first natural language query using a large language model-based encoder associated with a first large language model,
    comparing the query embeddings with sample embeddings associated with each DSL program code sample of the plurality of DSL program code samples of the sample DSL program code datastore, the sample embeddings having been determined using the large language model-based encoder associated with the first large language model, and
    selecting the one or more DSL program code samples based on a similarity between the query embeddings and the sample embeddings associated with the one or more DSL program code samples;

generating a first prompt for the first large language model based on the first natural language query from the first user and the one or more DSL program code samples, wherein generating the first prompt for the first large language model includes concatenating the first natural language query, the one or more DSL program code samples, and the document context information;

providing the first prompt to the first large language model to obtain a first program code, which when executed, causes the first application to perform the one or more actions, the first program code being implemented in the domain specific language;

analyzing a syntax of the first program code to identify syntax errors in the first program code;

correcting the syntax errors in the first program code to generate corrected program code; and causing the first client device to execute the first program code to perform the one or more actions in the first application on the first client device.

8. The data processing system of claim 1, wherein the machine-readable medium further includes instructions configured to cause the processor to perform operations of:

prior to generating the first prompt for the first large language model, analyzing the first natural language query using an intent classifier model configured to analyze the first prompt and to output an indication of a category of request associated with the first prompt;

determining whether the category of request associated with the first prompt is not supported by the first large language model; and providing the first natural language query to an external service provider to process the first natural language query responsive to determining that the category of request is not supported.

9. A data processing system comprising:

a processor; and a machine-readable medium storing executable instructions that, when executed, cause the processor alone or in combination with other processors to perform operations comprising:

receiving a first natural language query from a first user via a first user interface of a first client device, the first natural language query comprising a textual description of one or more actions to be performed using a first application on the first client device;

selecting one or more Domain Specific Language (DSL) program code samples in a domain specific language from among a plurality of DSL program code samples of a sample DSL program code datastore based on attributes of the first natural language query by:

determining query embeddings for a first natural language query using a large language model-based encoder associated with a first large language model, comparing the query embeddings with sample embeddings associated with each DSL program code sample of the plurality of DSL program code samples of the sample DSL program code datastore, the sample embeddings having been determined using the large language model-based encoder associated with the first large language model, and selecting the one or more DSL program code samples based on a similarity between the query embeddings and the sample embeddings associated with the one or more DSL program code samples;

generating a first prompt for the first large language model based on the first natural language query from the first user and the one or more DSL program code samples;

providing the first prompt to the first large language model to obtain a first program code, which when executed, causes the first application to perform the one or more actions, the first program code being implemented in the domain specific language;

analyzing a syntax of the first program code to identify syntax errors in the first program code;

correcting the syntax errors in the first program code to generate corrected program code;

causing the first client device to execute the first program code to perform the one or more actions in the first application on the first client device;

generating a first prompt for the first large language model based on the first natural language query from the first user, analyzing the first natural language query and the first program code with a content moderation service configured to identify potentially objectionable or offensive content; and causing the first client device to present a blocked content notification on the first user interface of the first client device instead of causing the first client device to execute the first program code responsive to the content moderation service determining that the first natural language query or the first program code include potentially objectionable or offensive content.

10. A method implemented in a data processing system for providing natural language commands in an application, the method comprising:

receiving a first natural language query from a first user via a first user interface of a first client device, the first natural language query comprising a textual description of one or more actions to be performed using a first application on the first client device;

selecting one or more Domain Specific Language (DSL) program code samples from among a plurality of DSL program code samples of a sample DSL program code datastore based on attributes of the first natural language query by:

determining query embeddings for the first natural language query using a large language model-based encoder associated with a first large language model, comparing the query embeddings with sample embeddings associated with each DSL program code sample of the plurality of DSL program code samples of the sample DSL program code datastore, the sample embeddings having been determined using the large language model-based encoder associated with the first large language model, ranking the plurality of DSL program code samples based on their respective vector similarity scores to generate ranked DSL program code samples;

partitioning the ranked DSL program code samples into a plurality of groups based on an entity category associated with each DSL program code sample of the plurality of DSL program code samples, the entity category representing an entity on which the first application can perform an action;

analyzing the first natural language query using a classifier model trained to identify and output a set of entity categories associated with the first natural language query; and selecting at least one DSL program code sample associated with each entity category in the set of entity categories output by the classifier model as the one or more DSL program code samples;

generating a first prompt for the first large language model based on the first natural language query from the first user and the one or more DSL program code samples;

providing the first prompt to the first large language model to obtain a first program code, which when executed, causes the first application to perform the one or more actions, the first program code being implemented in a domain specific language;

analyzing a syntax of the first program code to identify syntax errors in the first program code;

correcting the syntax errors in the first program code to generate corrected program code; and causing the first client device to execute the first program code to perform the one or more actions in the first application on the first client device.

11. The method of claim 10, wherein comparing the query embeddings with samples embeddings associated with each DSL program code sample of the plurality of DSL program code samples of the sample DSL program code datastore further comprises:

determining a cosine similarity score between the query embeddings and each of the sample embeddings to determine how similar the first natural language query is to each DSL program code sample of the plurality of DSL program code samples.

12. The method of claim 10, wherein analyzing the syntax of the first program code to identify syntax errors in the first program code further comprises:

parsing the first program code into an abstract syntax tree structure which represents a structure of the first program code; and comparing the abstract syntax tree structure with a syntax definition for the domain specific language to identify the syntax errors, wherein correcting the syntax errors in the first program code to generate corrected program code comprises updating the abstract syntax tree structure according to the syntax definition for the domain specific language.

13. A method implemented in a data processing system for providing natural language commands in an application, the method comprising:

receiving a first natural language query from a first user via a first user interface of a first client device, the first natural language query comprising a textual description of one or more actions to be performed using a first application on the first client device;

selecting one or more Domain Specific Language (DSL) program code samples in a domain specific language from among a plurality of DSL program code samples of a sample DSL program code datastore based on attributes of the first natural language query by:

determining query embeddings for the first natural language query using a large language model-based encoder associated with a first large language model, comparing the query embeddings with sample embeddings associated with each DSL program code sample of the plurality of DSL program code samples of the sample DSL program code datastore, the sample embeddings having been determined using the large language model-based encoder associated with the first large language model, and selecting the one or more DSL program code samples based on a similarity between the query embeddings and the sample embeddings associated with the one or more DSL program code samples;

generating a first prompt for the first large language model based on the first natural language query from the first user and the one or more DSL program code samples;

providing the first prompt to the first large language model to obtain a first program code, which when executed, causes the first application to perform the one or more actions, the first program code being implemented in the domain specific language;

analyzing a syntax of the first program code to identify syntax errors in the first program code includes:

parsing the first program code into an abstract syntax tree structure which represents a structure of the first program code, and comparing the abstract syntax tree structure with a syntax definition for the domain specific language to identify the syntax errors, correcting the syntax errors in the first program code to generate corrected program code by updating the abstract syntax tree structure according to the syntax definition for the domain specific language; and causing the first client device to execute the first program code to perform the one or more actions in the first application on the first client device including providing the abstract syntax tree structure to the first client device to cause the first client device to transpile the abstract syntax tree structure into platform-specific program code suitable for execution on the first client device and execute the platform-specific program code to cause the first application to perform the one or more actions described in the first natural language query.

14. The method of claim 10, generating the first prompt for the first large language model further comprises:

analyzing the first natural language query with a grounding determination model that is trained to analyze the first natural language query and output an indication whether the first natural language query requires factual grounding;

generating a search query based on the first natural language query responsive to the grounding determination model outputting an indication that the first natural language query requires factual grounding;

providing the search query to a search engine to cause the search engine to execute the search query and obtain search results; and summarizing the search results into grounded textual content;

wherein generating the first prompt for the first large language model includes concatenating the first natural language query, the one or more DSL program code samples, and the grounded textual content.

15. The method of claim 14, further comprising:

determining query embeddings for the first natural language query using the large language model-based encoder associated with the first large language model;

partitioning the search results into a plurality of segments;

determining knowledge-based embeddings for each of the plurality of segments of the search results;

comparing the query embeddings with the knowledge-based embeddings to determine a similarity score for each knowledge-based embedding each of the knowledge-based embeddings;

ranking the knowledge-based embeddings based on the similarity score;
selecting a subset of the knowledge-based embeddings;
combining the query embeddings and the knowledge-based embeddings into a second prompt for the first large language model;
providing the second prompt to the first large language model to obtain grounded textual content; and
adding the grounded textual content to the first prompt to be provided to the first large language model.

16. A method implemented in a data processing system for providing natural language commands in an application, the method comprising:
   receiving a first natural language query, and document context information from a first user via a first user interface of a first client device, the first natural language query comprising a textual description of one or more actions to be performed using a first application on the first client device, the document context information providing attributes of electronic content in the first application to be modified according to the first natural language query, to be used to generate new content based on the electronic content, to be used add the new content to the electronic content, or a combination thereof;
   selecting one or more Domain Specific Language (DSL) program code samples in a domain specific language from among a plurality of DSL program code samples of a sample DSL program code datastore based on attributes of the first natural language query by:
      determining query embeddings for the first natural language query using a large language model-based encoder associated with a first large language model,
      comparing the query embeddings with sample embeddings associated with each DSL program code sample of the plurality of DSL program code samples of the sample DSL program code datastore, the sample embeddings having been determined using the large language model-based encoder associated with the first large language model, and
      selecting the one or more DSL program code samples based on a similarity between the query embeddings and the sample embeddings associated with the one or more DSL program code samples;
   generating a first prompt for the first large language model based on the first natural language query from the first user and the one or more DSL program code samples, wherein generating the first prompt for a first LLM includes concatenating the first natural language query, the one or more DSL program code samples, and the document context information;
   providing the first prompt to the first large language model to obtain a first program code, which when executed, causes the first application to perform the one or more actions, the first program code being implemented in the domain specific language;
   analyzing a syntax of the first program code to identify syntax errors in the first program code includes:
      parsing the first program code into an abstract syntax tree structure which represents a structure of the first program code, and
      comparing the abstract syntax tree structure with a syntax definition for the domain specific language to identify the syntax errors,
   correcting the syntax errors in the first program code to generate corrected program code by updating the abstract syntax tree structure according to the syntax definition for the domain specific language; and
   causing the first client device to execute the first program code to perform the one or more actions in the first application on the first client device.

17. A data processing system comprising:
   a processor; and
   a machine-readable medium storing executable instructions that, when executed, cause the processor to perform operations comprising:
      receiving a first natural language query, and document context information from a first user via a first user interface of a first client device, the first natural language query comprising a textual description of one or more actions to be performed using a first application on the first client device, the document context information providing attributes of electronic content in the first application to be to be modified according to the first natural language query, to be used to generate new content based on the electronic content, to be used add the new content to the electronic content, or a combination thereof;
      generating a first prompt for a first large language model based on the first natural language query and the document context information;
      providing the first prompt to the first large language model to obtain a first program code, which when executed, causes the first application to perform the one or more actions, the first program code being implemented in a domain specific language (DSL);
      analyzing a syntax of the first program code to identify syntax errors in the first program code by:
         parsing the first program code into an abstract syntax tree structure which represents a structure of the first program code; and
         comparing the abstract syntax tree structure with a syntax definition for the DSL to identify the syntax errors;
      correcting the syntax errors in the first program code to generate corrected program code by updating the abstract syntax tree structure according to the syntax definition for the DSL; and
      causing the first client device to execute the first program code to perform the one or more actions in the first application on the first client device.

18. The data processing system of claim 17, wherein generating the first prompt for the first large language model (LLM) based on the first natural language query from the first user further comprises:
   selecting one or more DSL program code samples from a sample DSL program code datastore based on attributes of the first natural language query;
   obtaining DSL syntax information associated with each entity referenced in the first natural language query;
   obtaining rules information associated with each entity referenced in the first natural language query; and
   concatenating the first natural language query, the one or more DSL program code samples, the DSL syntax information, and the rules information to generate the first prompt.

* * * * *